US005974407A

United States Patent [19]

Sacks

[11] Patent Number: 5,974,407

[45] Date of Patent: Oct. 26, 1999

[54] METHOD AND APPARATUS FOR IMPLEMENTING A HIERARCHICAL DATABASE MANAGEMENT SYSTEM (HDBMS) USING A RELATIONAL DATABASE MANAGEMENT SYSTEM (RDBMS) AS THE IMPLEMENTING APPARATUS

[76] Inventor: Jerome E. Sacks, 8 Thoreau Rd., Lexington, Mass. 02173

[21] Appl. No.: 08/939,574

[22] Filed: Sep. 29, 1997

[51] Int. Cl.[6] .................... G06F 17/30

[52] U.S. Cl. .................... 707/2; 707/1; 707/100

[58] Field of Search .................... 707/2, 100, 1

[56] References Cited

U.S. PATENT DOCUMENTS

| | | | |
|---|---|---|---|
| 4,429,385 | 1/1984 | Cichelli et al. . | |
| 5,201,046 | 4/1993 | Goldberg et al. . | |
| 5,201,047 | 4/1993 | Maki et al. . | |
| 5,295,261 | 3/1994 | Simonetti | 707/2 |
| 5,379,419 | 1/1995 | Heffernan et al. . | |
| 5,467,471 | 11/1995 | Bader | 707/1 |
| 5,504,885 | 4/1996 | Alashqur | 395/705 |
| 5,581,756 | 12/1996 | Nakabayashi | 707/2 |
| 5,724,577 | 3/1998 | Exley et al. | 707/100 |
| 5,774,692 | 6/1998 | Boyer et al. | 395/500 |
| 5,787,425 | 7/1998 | Bigus | 707/6 |

OTHER PUBLICATIONS

Joe Celko, SQL for Smarties, 1995, pp. 333–360. Morgan Stanley Publishers, San Francisco, California.

Thomas A. Bruce, Designing Quality Databases with IDEF1X Information Models, p. 530, Dorset House Publishing, New York, New York (1992) p. 530.

*Primary Examiner*—Paul R. Lintz
*Attorney, Agent, or Firm*—George Grayson

[57] ABSTRACT

The invention is directed to a computer implemented system and apparatus for construction of a Hierarchical Database Management System (HDBMS) using a commercially available Relational Database Management System (RDBMS) as the implementing apparatus. The invention uses one or more RDBMS tables to store rows of a hierarchical database implemented by the HDBMS. Composite keys, unique over all the tables, are used to maintain hierarchical families and maintain the hierarchical parent/child relationships within families. Root conditions and child conditions may be used to determine which tables may be used for adding root row starting a new family, and which tables may be used for adding a child row of a selected parent row. SQL select queries present hierarchical views of the hierarchical database. SQL action queries are used to perform the database functions of insert root, insert child, update row, and delete row and its descendents. Both relational databases and hierarchical databases can be implemented in the same application using the RDBMS and the imbedded HDBMS together, and standard RDBMS SQL can be used to process the hierarchical and relational data in an integrated manner.

41 Claims, 28 Drawing Sheets

| Table ID | Table Name |
|---|---|
| 1 | Corp Lead |
| 2 | Indiv Lead |
| 3 | Corp Info |
| 4 | Contact Info |
| 5 | Action |
| 6 | To Do |
| 7 | Take Order |

FIG. 1A 1B-10

| Parent ID | Parent | Child ID | Child | |
|---|---|---|---|---|
| 0 | <Root> | 1 | Corp Lead | 1B-12 |
| 0 | | 2 | Indiv Lead | |
| 1 | Corp Lead | 3 | Corp Info | 1B-14 |
| 1 | | 4 | Contact Info | |
| 1 | | 5 | Action | |
| 1 | | 6 | To Do | |
| 2 | Indiv Lead | 5 | Action | 1B-16 |
| 2 | | 6 | To Do | |
| 3 | Corp Info | 3 | Corp Info | 1B-18 |
| 4 | Contact Info | 4 | Contact Info | |
| 5 | Action | 5 | Action | |
| 5 | | 6 | To Do | |
| 5 | | 7 | Take Order | |
| 6 | To Do | 5 | Action | 1B-12 |
| 6 | | 6 | To Do | |

FIG. 1B

| | hTableID | vTableName | hFieldName |
|---|---|---|---|
| | 1 | Corp Lead | LeadSource |
| | 1 | Corp Lead | LeadDate |
| | 1 | Corp Lead | LeadFullName |
| 1C-10 | 1 | Corp Lead | LeadPhoneNo |
| | 1 | Corp Lead | LeadMailingAddress |
| | 1 | Corp Lead | LeadCompany |
| | 2 | Indiv Lead | FirstName |
| | 2 | Indiv Lead | LeadSource |
| 1C-12 | 2 | Indiv Lead | LeadDate |
| | 2 | Indiv Lead | Telephone |
| | 2 | Indiv Lead | YearOfConf |
| | 3 | Corp Info | CorpName |
| | 3 | Corp Info | Address |
| | 3 | Corp Info | City |
| | 3 | Corp Info | State |
| | 3 | Corp Info | ContactFullName |
| | 3 | Corp Info | AnnualSales |
| | 3 | Corp Info | Photo |
| | 3 | Corp Info | isCustomer |
| | 3 | Corp Info | NumEmployees |
| | 3 | Corp Info | Assets |
| | 4 | Contact Info | LastName |
| | 4 | Contact Info | FirstName |
| | 4 | Contact Info | Address |
| | 4 | Contact Info | City |
| | 4 | Contact Info | State |
| | 4 | Contact Info | Phone |
| | 4 | Contact Info | Title |
| | 4 | Contact Info | Age |
| | 5 | Action | ActionID |
| | 5 | Action | ContactFullName |
| | 5 | Action | ActionDate |
| | 5 | Action | Comments |
| | 5 | Action | isCompleted |
| | 5 | Action | PriorityNo |
| | 6 | To Do | DueDate |
| | 6 | To Do | Priority |
| | 6 | To Do | isCompleted |
| | 6 | To Do | Title |
| | 6 | To Do | Discussion |
| | 7 | Take Order | OrderDate |
| | 7 | Take Order | CatalogNo |
| | 7 | Take Order | Description |
| | 7 | Take Order | UnitPrice |
| | 7 | Take Order | Quantity |
| | 7 | Take Order | BillTo |
| | 7 | Take Order | BuyerPhone |
| | 7 | Take Order | Notes |
| | 7 | Take Order | TotalPrice |

FIG. 1C 3B-10 3B-12 3B-14 3B-16 3B-20 3B-18

| fieldName | Type | Length | Description |
|---|---|---|---|
| hAllowZeroLength | boolean | | True if zero length string is allowed |
| hDefaultValue | text | 255 | Default value of field |
| hFieldName | text | 50 | Name of field |
| hFieldPrefix | text | 50 | Text displayed in view preceding field value |
| hFieldSize | integer | | Maximum length of text for text and memo fields |
| hFieldType | integer | | 1-boolean;2-byte;3-integer;4-long;5-currency;6-single;7-double;8-date/time;10-text (max length 255 char);11-OLE;12-memo |
| hIndexType | integer | | 0- unindexed; 1-indexed (duplicates allowed);2-indexed (no dupicates) |
| hIsDefault | boolean | | Definines default view |
| hTableID | long | | Unique table indentifier for tables that store hierarchcil data |
| hTableIDChild | long | | Value of hTableID for child table defining parent/chid constraint |
| hTableIDParent | long | | Value of hTableID for parent table defining parent/chid constraint |
| hTableName | text | 50 | Table name of tables that stores hierarchical data |
| hValidationRule | text | 255 | Validation rule applied to data entered into field |
| hValidationText | text | 255 | Displayed text if validation rule regects entered data |
| hViewID | long | | View ID identifying view |
| hViewName | text | 50 | Name of View presented to user |
| hViewSQL | memo | | SQL statement that generates view |
| vTableName | text | 50 | Table name presented to users in views |

FIG. 3B 4-15

| hTableID | vTableName | hTableName |
|---|---|---|
| 1 | Corp Lead | CorpLead |
| 2 | Indiv Lead | IndivLead |
| 3 | Corp Info | CorpInfo |
| 4 | Contact Info | ContactInfo |
| 5 | Action | Action |
| 6 | To Do | ToDo |
| 7 | Take Order | TakeOrder |

5A-12 → hTableID
5A-14 → vTableName
5A-16 → hTableName
5A-10 → rows 1–7

4-15 Continued 5B-10 5B-12 5B-14 5B-16 5B-18

| hTableID | hFieldName | hFieldType | hFieldSize | hDefaultValue |
|---|---|---|---|---|
| 1 | LeadCompany | 10 | 50 | |
| 1 | LeadDate | 8 | | |
| 1 | LeadFullName | 10 | 50 | |
| 1 | LeadmailingAddress | 10 | 50 | |
| 1 | LeadPhoneNo | 10 | 25 | |
| 1 | LeadSource | 10 | 50 | |
| 2 | FirstName | 10 | 25 | |
| 2 | Lastname | 10 | 25 | |
| 2 | LeadDate | 8 | | |
| 2 | LeadSource | 10 | 255 | |
| 2 | Telephone | 10 | 25 | |
| 2 | YearOfConf | 4 | | |
| 3 | Address | 10 | 255 | |
| 3 | AnnualSales | 5 | | |
| 3 | Assets | 5 | | |
| 3 | City | 10 | 25 | |
| 3 | ContactFullName | 10 | 255 | |
| 3 | CorpName | 10 | 255 | |
| 3 | isCustomer | 1 | | |
| 3 | NumEmployees | 4 | | |
| 3 | Photo | 11 | | |
| 3 | State | 10 | 2 | |
| 4 | Address | 10 | 255 | |
| 4 | Age | 3 | | |
| 4 | City | 10 | 25 | |
| 4 | FirstName | 10 | 25 | |
| 4 | LastName | 10 | 25 | |
| 4 | Phone | 10 | 25 | |
| 4 | State | 10 | 2 | |
| 4 | Title | 10 | | |
| 5 | ActionDate | 8 | | |
| 5 | ActionID | 3 | | |
| 5 | Comments | 12 | | |
| 5 | ContactFullName | 10 | 255 | |
| 5 | isCompleted | 1 | | |
| 5 | PriorityNo | 3 | | |
| 6 | Discussion | 12 | | |
| 6 | DueDate | 8 | | |
| 6 | isCompleted | 1 | | |
| 6 | Priority | 3 | | |
| 6 | Title | 10 | 50 | |
| 7 | BillTo | 12 | | |
| 7 | BuyerPhone | 10 | 25 | |
| 7 | CatalogNo | 4 | | |
| 7 | Description | 10 | 255 | |
| 7 | Notes | 12 | | |
| 7 | OrderDate | 8 | | |
| 7 | Quantity | 6 | | |
| 7 | TotalPrice | 5 | | |
| 7 | UnitPrice | 5 | | |

FIG. 5B 5B-10 5B-20 5B-22 5B-24 5B-26

| hTableID | hFieldName | hIndexType | hValidationRule | hValidationText | hAllowZeroLe |
|---|---|---|---|---|---|
| 1 | LeadCompany | 0 | | | 0 |
| 1 | LeadDate | 1 | | | 0 |
| 1 | LeadFullName | 0 | | | 0 |
| 1 | LeadmailingAddress | 0 | | | 0 |
| 1 | LeadPhoneNo | 0 | | | 0 |
| 1 | LeadSource | 0 | | | 0 |
| 2 | FirstName | 0 | | | 0 |
| 2 | Lastname | 0 | | | 0 |
| 2 | LeadDate | 0 | | | 0 |
| 2 | LeadSource | 0 | | | 0 |
| 2 | Telephone | 0 | | | 0 |
| 2 | YearOfConf | 0 | | | 0 |
| 3 | Address | 0 | | | 0 |
| 3 | AnnualSales | 0 | | | 0 |
| 3 | Assets | 0 | | | 0 |
| 3 | City | 0 | | | 0 |
| 3 | ContactFullName | 0 | | | 0 |
| 3 | CorpName | 1 | | | 0 |
| 3 | isCustomer | 0 | | | 0 |
| 3 | NumEmployees | 0 | | | 0 |
| 3 | Photo | 0 | | | 0 |
| 3 | State | 0 | | | 0 |
| 4 | Address | 0 | | | 0 |
| 4 | Age | 0 | | | 0 |
| 4 | City | 0 | | | 0 |
| 4 | FirstName | 0 | | | 0 |
| 4 | LastName | 1 | | | 0 |
| 4 | Phone | 0 | | | 0 |
| 4 | State | 0 | | | 0 |
| 4 | Title | 1 | | | 0 |
| 5 | ActionDate | 1 | | | 0 |
| 5 | ActionID | 1 | | | 0 |
| 5 | Comments | 0 | | | 0 |
| 5 | ContactFullName | 0 | | | 0 |
| 5 | isCompleted | 0 | | | 0 |
| 5 | PriorityNo | 0 | | | 0 |
| 6 | Discussion | 0 | | | 0 |
| 6 | DueDate | 1 | | | 0 |
| 6 | isCompleted | 0 | | | 0 |
| 6 | Priority | 0 | | | 0 |
| 6 | Title | 0 | | | 0 |
| 7 | BillTo | 0 | | | 0 |
| 7 | BuyerPhone | 0 | | | 0 |
| 7 | CatalogNo | 1 | | | 0 |
| 7 | Description | 0 | | | 0 |
| 7 | Notes | 0 | | | 0 |
| 7 | OrderDate | 0 | | | 0 |
| 7 | Quantity | 0 | | | 0 |
| 7 | TotalPrice | 0 | | | 0 |
| 7 | UnitPrice | 0 | | | 0 |

6-14    6-16 hTableIDParent  hTableIDChild

| hTableIDParent | hTableIDChild |
|---|---|
| 0 | 1 |
| 0 | 2 |
| 1 | 3 |
| 1 | 4 |
| 1 | 5 |
| 1 | 6 |
| 2 | 5 |
| 2 | 6 |
| 3 | 3 |
| 4 | 4 |
| 5 | 5 |
| 5 | 6 |
| 5 | 7 |
| 6 | 5 |
| 6 | 6 |

6-12 (rows 1-2), 6-10 (bracket), 6-18 (last two rows)

4-18

7A-12

7A-10

| hViewID | hViewName | hViewSQL | isDefault |
|---|---|---|---|
| 1 | Default | | -1 |

7B-18 (first two rows), 7B-20 (rows three and four)

| hViewID | hTableID | hFieldName | hFieldPrefix |
|---|---|---|---|
| 1 | 1 | LeadFullName | Name: |
| 1 | 1 | LeadSource | Source: |
| 1 | 2 | LastName | Name: |
| 1 | 2 | LeadSource | Source: |
| 1 | 3 | CorpName | Company: |
| 1 | 3 | isCustomer | Industry: |
| 1 | 4 | LastName | Name: |
| 1 | 4 | Title | Title: |
| 1 | 5 | ActionDate | Date: |
| 1 | 5 | ActionID | ID: |
| 1 | 5 | Comments | What to Do: |
| 1 | 6 | DueDate | Due: |
| 1 | 6 | Priority | Priority: |
| 1 | 6 | Title | Item: |
| 1 | 7 | Notes | Buyer: |
| 1 | 7 | OrderDate | Date: |
| 1 | 7 | TotalPrice | Sale: |

FIG. 7B 4-22

```
Public Sub CreateNativeTablesByDAO()
 'creates tables defined by hTable and hField
8A-10  Dim db As Database, tbl As TableDef, fld As Field, rsTable As Recordset, rsF As Recordset
       Dim s As String, t As String
       Const QT = """"

8A-12  Set db = CurrentDb()

8A-14  s = "SELECT * FROM hTable "
       Set rsTable = db.OpenRecordset(s)
8A-16  Do Until rsTable.EOF
8A-17   s = "SELECT * FROM hField WHERE hTableID=" & rsTable!hTableID
        Set rsF = db.OpenRecordset(s)
8A-18   Set tbl = db.CreateTableDef(rsTable!hTableName)
8A-19     If Not rsF.EOF Then 'no fields check

8A-20     Set fld = tbl.CreateField("hKey")
          fld.Type = 10    :fld.Size = 255
          fld.AllowZeroLength = False :  fld.Required = True
          tbl.Fields.Append fld

8A-22     Set fld = tbl.CreateField("hNode")
          fld.Type = 10  :  fld.Size = 255
          fld.AllowZeroLength = True  : fld.Required = True
          tbl.Fields.Append fld
8A-24     '
          Do Until rsF.EOF
8A-26      Set fld = tbl.CreateField(rsF!hFieldName)
           On Error Resume Next
           fld.Type = rsF!nFieldType
           If fld.Type = 10 Then
             fld.Size = 255        :    fld.AllowZeroLength = rsF!hAllowZeroLength
           End If
           fld.ValidationRule = rsF!hValidationRule
           fld.Required = rsF!hRequired
           On Error GoTo 0
           tbl.Fields.Append fld
8A-28      rsF.MoveNext
          Loop
8A-30      db.TableDefs.Append tbl
         End If
8A-32   rsTable.MoveNext
       Loop 'over tables
End Sub
```

1 - CorpLead

| hkey | hNode | LeadSource | LeadDate | LeadFullName | LeadPhoneN | LeadMailingAddress | LeadCompany |
|---|---|---|---|---|---|---|---|
| A 0001 | 0000 | NewYorkerA | 3/17/95 | Jim Smith | 222-222-2222 | 1 Park Ave, NYC,NY | ACMECorp. |

8B-12 8B-14

8B-22

2-IndivLead

| nkey | nNode | Lastname | FirstName | LeadSource | LeadDate | Telephone | YearOfConf |
|---|---|---|---|---|---|---|---|
| A_0002 | 0000 | Brown | Susan | NY | 6/7/95 | 444-444-4444 | 1995 |

8B-18

8B-24

3-CorpInfo

| hkey | hNode | CorpNam | Address | City | State | ContactFull | AnnualSales | Photo | isCustomer | NumEmploy | Assets |
|---|---|---|---|---|---|---|---|---|---|---|---|
| A_0001 | 0000_0001 | ACME | 1 Main St | New York | NY | John Doe | $300,000.00 | | -1 | 35 | $200,000.00 |

8B-26

4-ContactInfo

| hkey | hNode | LastName | FirstName | Address | City | State | Phone | Title | Age |
|---|---|---|---|---|---|---|---|---|---|

8B-28

5-Action

| hkey | hNode | ActionID | ContactFullNam | ActionDate | Comments | isCompleted | PriorityNo |
|---|---|---|---|---|---|---|---|
| A 0001 | 0000 0000 | 1 | Jim Smith | 3/23/95 | This is a | -1 | 1 |
| A 0001 | 0000 0000 0000 0000 | 2 | Mary Doe | 4/2/95 | Please | -1 | 2 |

8B-30

6 - ToDo

| nkey | hNode | DueDate | Priorityy | isCompleted | Title | Discussion |
|---|---|---|---|---|---|---|
| A_0001 | 0000_0000_0000 | 5/21/39 | 2 | -1 | Call customer | 1234567890123456789012 |
| A_0001 | 0000_0000_0000_0001 | 4/7/95 | 2 | 0 | Review sales course | Get it done fast |
| A_0002 | 0000_0000 | 7/1/95 | 3 | 0 | Likes sports. | Call and get her interest. |

8B-32

7-TakeOrder

| hkey | hNode | OrderDate | CatalogNo | Description | UnitPrice | Quantity | TotalPrice | BillTo | BuyerPhone |
|---|---|---|---|---|---|---|---|---|---|
| A_0001 | 0000_0000_0000_0000_0000 | 4/5/95 | 32543 | TV | $335.00 | 2 | $335.00 | Mary Doe | 333-333-3333 |

FIG. 8B

| hKey (9A-12) | hNode (9A-14) | | hTableID (9A-16) | View (9A-10) | |
|---|---|---|---|---|---|
| A_0001 | 0000 | 9A-18 | 1 | Corp Lead - Name:Jim Smith, Source:NewYorkerAdvt | 9A-35 |
| A_0001 | 0000_0000 | 9A-20 | 5 | Action - ID:1, Date:3/23/95, What to Do:This is a good lead. | 9A-35 |
| A_0001 | 0000_0000_0000 | 9A-22 | 6 | To Do - Due:5/21/39, Item:Call customer, Priority:2 | 9A-35 |
| A_0001 | 0000_0000_0000_0000 | 9A-24 | 5 | Action - ID:2, Date:4/2/95, What to Do:Please provide recommendation. | 9A-35 |
| A_0001 | 0000_0000_0000_0000_0000 | 9A-26 | 7 | Take Order - Date:4/5/95, Sale:335, Buyer:30 day moneyback | 9A-35 |
| A_0001 | 0000_0000_0000_0001 | 9A-28 | 6 | To Do - Due:4/7/95, Item:Review sales course, Priority:2 | 9A-35 |
| A_0001 | 0000_0001 | 9A-30 | 3 | Corp Info - Company:ACME Corp, Industry:-1 | 9A-35 |
| A_0002 | 0000 | 9A-32 | 2 | Indiv Lead - Name:Brown, Source:NY Convention ctr.6/1/95 | 9A-36 |
| A_0002 | 0000_0000 | 9A-34 | 6 | To Do - Due:7/1/95, Item:Likes sports., Priority:3 | 9A-36 |

FIG. 9A

| hKey | hNode | |
|---|---|---|
| A_0001 | 0 | 9B-10 |
| A_0001 | 0.0 | |
| A_0001 | 0.0.0 | |
| A_0001 | 0.0.0.0 | |
| A_0001 | 0.0.0.0.0 | |
| A_0001 | 0.0.0.1 | |
| A_0001 | 0.1 | |
| A_0002 | 0 | 9B-12 |
| A_0002 | 0.0 | |

| | | |
|---|---|---|
| A_0001 | 0 | 9B-14 |
| A_0001 | 0.0 | |
| A_0001 | 0.0.0 | |
| A_0001 | 0.1 | |
| A_0001 | 0.2 | |
| A_0001 | 0.2.0 | |
| A_0001 | 0.2.0.0 | |
| A_0001 | 0.3 | |
| A_0001 | 0.4 | |
| A_0001 | 0.5 | |
| A_0001 | 0.6 | |
| A_0001 | 0.7 | |
| A_0001 | 0.8 | |
| A_0001 | 0.9 | |
| A_0002 | 0 | 9B-16 |
| A_0002 | 0.0 | |
| A_0001 | 0 | 9B-18 |
| A_0001 | 0.00 | |
| A_0001 | 0.00.0 | |
| A_0001 | 0.01 | |
| A_0001 | 0.02 | |
| A_0001 | 0.02.0 | |
| A_0001 | 0.02.0.0 | |
| A_0001 | 0.03 | |
| A_0001 | 0.04 | |
| A_0001 | 0.05 | |
| A_0001 | 0.06 | |
| A_0001 | 0.07 | |
| A_0001 | 0.08 | |
| A_0001 | 0.09 | |
| A_0001 | 0.10 | |
| A_0002 | 0 | 9B-20 |
| A_0001 | 0.0 | |

9C-10
```
SELECT hKey, hNode,1 AS hTableID,
String(3 * fLevel([hNode])," ")
& "Corp Lead" & " - " & "Name:" & [LeadFullName] & ", " & "Source:" & [LeadSource] As View
FROM CorpLead
```
9C-38

9C-24
```
UNION
```

9C-12
```
SELECT hKey, hNode,2 AS hTableID,
String(3 * fLevel([hNode])," ")
& "Indiv Lead" & " - " & "Name:" & [LastName] & ", " & "Source:" & [LeadSource] As View
FROM IndivLead
```
9C-40

9C-26
```
UNION
```

9C-14
```
SELECT hKey, hNode,3 AS hTableID,
String(3 * fLevel([hNode])," ")
& "Corp Info" & " - " & "Company:" & [CorpName] & ", " & "Industry:" & [isCustomer] As View
FROM CorpInfo
```

9C-28
```
UNION
```

9C-16
```
SELECT hKey, hNode,4 AS hTableID,
String(3 * fLevel([hNode])," ")
& "Contact Info" & " - " & "Name:" & [LastName] & ", " & "Title:" & [Title] As View
FROM ContactInfo
```

9C-30
```
UNION
```

9C-18
```
SELECT hKey, hNode,5 AS hTableID,
String(3 * fLevel([hNode])," ")
& "Action" & " - " & "ID:" & [ActionID] & ", " & "Date:" & [ActionDate] & ", " & "What to Do:" &
LEFT([Comments],50) As View
FROM Action
```

9C-32
```
UNION
```

9C-20
```
SELECT hKey, hNode,6 AS hTableID,
String(3 * fLevel([hNode])," ")
& "To Do" & " - " & "Due:" & [DueDate] & ", " & "Item:" & [Title] & ", " & "Priority:" & [Priority] As
View
FROM ToDo
```

9C-34
```
UNION
```

9C-22
```
SELECT hKey, hNode,7 AS hTableID,
String(3 * fLevel([hNode])," ")
& "Take Order" & " - " & "Date:" & [OrderDate] & ", " & "Sale:" & [TotalPrice] & ", " & "Buyer:" &
LEFT([Notes],50) As View
FROM TakeOrder
```

9C-36
```
ORDER BY hKey, hNode;
```

FIG. 9C

```
9D-10
SELECT
9D-12   hKey,
9D-14   hNode,
9D-16   7 AS hTableID,
9D-18   String(3 * fLevel([hNode])," ")
                  9D-26                                      9D-28
9D-20   & "Take Order" & " -  " & "Date:" & [OrderDate]
             9D-30            9D-32
        & ", "  & "Sale:" & [TotalPrice]
             9D-34            9D-36
        & ", "  & "Buyer:" & LEFT([Notes],50)
9D-22   As View
9D-24 FROM TakeOrder;
```

FIG. 9D

```
INSERT INTO Action (hKey, hNode, actionID, ContactFullName,
comments)
VALUES(sKeyP, getNewChildNode(sKeyP, sNodeP, iTableID), 14, "Mary
Doe", "This is a good lead")
```

11C-10

12B-10

12B-12

12B-14

```
UPDATE CorpLead
SET LeadFullName = "Jim Doe"
WHERE hKey ="A_0001" AND hNode="0000";
```

FIG. 12B 14A-10 qryRoot
```
SELECT hKey, [LeadFullName] as  SORT1
From CorpLead
UNION SELECT hKey,  [FirstName] & " " &  [Lastname] AS SORT1
FROM IndivLead;
```

14A-12

FIG. 14A qryView
```
select hKey, hNode,1 AS nTableID,
   String(3 * fLevel([hNode])," ") & "Corp Lead" & " -  " & "Name:" & [LeadFullName] & ", " & "Source:" &
[LeadSource] As ViewSQL From CorpLead
UNION
select hKey, hNode,2 AS nTableID,String(3 * fLevel([hNode])," ") & "Indiv Lead" & " -  " & "Name:" & [Lastname]
& ", " & "Source:" & [LeadSource] As ViewSQL From IndivLead
UNION
select hKey, hNode,3 AS nTableID,String(3 * fLevel([hNode])," ") & "Corp Info" & " -  " & "Company:" &
[CorpName] & ", " & "Industry:" & [isCustomer] As ViewSQL From CorpInfo
UNION
select hKey, hNode,4 AS nTableID,String(3 * fLevel([hNode])," ") & "Contact Info" & " -  " & "Name:" &
[LastName] & ", " & "Title:" & [Title] As ViewSQL From ContactInfo
UNION
select hKey, hNode,5 AS nTableID,String(3 * fLevel([hNode])," ") & "Action" & " -  " & "ID:" & [ActionID] & ", " &
"Date:" & [ActionDate] & ", " & "What to Do:" & LEFT([Comments],50) As ViewSQL From Action
UNION
select hKey, hNode,6 AS nTableID,String(3 * fLevel([hNode])," ") & "To Do" & " -  " & "Due:" & [DueDate] & ", "
& "Item:" & [Title] & ", " & "Priority:" & [Priority] As ViewSQL From ToDo
UNION
select hKey, hNode,7 AS nTableID,String(3 * fLevel([hNode])," ") & "Take Order" & " -  " & "Date:" & [OrderDate]
& ", " & "Sale:" & [TotalPrice] & ", " & "Buyer:" & LEFT([Notes],50) As ViewSQL
From TakeOrder;
```

FIG. 14B

4-32 qryViewSortedByName

14C-10

```
SELECT qryRoot.SORT1, qryView.ViewSQL
FROM qryRoot, qryView
WHERE (qryRoot.hKey)=[qryView].[hKey]
ORDER BY qryRoot.SORT1, qryView.hKey, qryView.hNode;
```

| **SORT1** | **ViewSQL** |
| --- | --- |
| Jim Smith | Corp Lead - Name:Jim Smith, Source:NewYorkerAdvt |
| Jim Smith | Action - ID:1, Date:3/23/95, What to Do:This is a good lead. |
| Jim Smith | To Do - Due:5/21/39, Item:Call customer, Priority:2 |
| Jim Smith | Action - ID:2, Date:4/2/95, What to Do:Please provide recommendation. |
| Jim Smith | Take Order - Date:4/5/95, Sale:335, Buyer:30 day moneback guarantee. |
| Jim Smith | To Do - Due:4/7/95, Item:Review sales course, Priority:2 |
| Jim Smith | Corp Info - Company:ACME Corp, Industry:-1 |
| Susan Brown | Indiv Lead - Name:Brown, Source:NY Convetion ctr.6/1/95 |
| Susan Brown | To Do - Due:7/1/95, Item:Likes sports., Priority:3 |

FIG. 14D

METHOD AND APPARATUS FOR IMPLEMENTING A HIERARCHICAL DATABASE MANAGEMENT SYSTEM (HDBMS) USING A RELATIONAL DATABASE MANAGEMENT SYSTEM (RDBMS) AS THE IMPLEMENTING APPARATUS

FIELD OF THE INVENTION

This invention relates to database management systems, and more particularly to implementing a hierarchical database management system (HDBMS) using a relational database management system (RDBMS).

DESCRIPTION OF THE PRIOR ART

A database, by definition, is "an organized collection of data values" [Bruce]. A database management system, by definition, is a "computer application that manages the storage of data, and presents it to application programs in a form independent of storage" [Ibid.].

Four examples of databases that most people are familiar with are the following:

- a book with a table of contents
- a calendar or appointment book
- an office filing system where information is stored in file folders placed under categories and subcategories and stored in file cabinets
- an organization chart The first thing to observe from these four examples is that they are not necessarily implemented on a computer. While a database management system (DBMS) is a computer application, a database is not necessarily one. The four examples have certain characteristics in common: viz.

a. They are easy to understand and use b. They are easy to maintain and modify c. They do not support the management of complex relationships among information The organization of the information in these four examples is hierarchical. Every record is either at the top a hierarchy (a root record) or is the child of another record in the hierarchical database.

The three items above are characteristics of a hierarchical database; viz.

Characteristics of a Hierarchical Database

| | |
|---|---|
| a. Presentability | Excellent |
| b. Resiliency | Excellent |
| c. Precision | Poor |

While hierarchical databases abound in the non-computerized world, there are several computerized implementations of Hierarchical Database Management Systems. Three Hierarchical Database Management Systems in use today are:

HDBMS

- Lotus Notes Version 4.5 (IBM)
- IMS/ESA Version 6 (IBM)
- MUMPS (Micronetics Standard MUMPS Version 4.3)

Lotus Notes is the most popular HDBMS in use today. There were nine million installed copies in 1996 and 17 million anticipated for 1997. Although Lotus Notes has many other powerful features in addition to storing information hierarchically that account for its popularity, this patent will compare this invention to Notes only with regard to its hierarchical database capability.

Relational databases have one characteristic that makes them ideally suited to overcome the main deficiency of hierarchical databases. They are designed to manage with excellent precision the complex relationships among data in database records. However relational databases do have their drawbacks. They are very unresilient when it comes to changing the design of a completed, complex application. They represent a significant challenge to the developer to provide a user friendly and intuitive interface that business people can use easily and effectively.

Summarizing:

Characteristics of a Relational Database

| | |
|---|---|
| a. Presentability | Poor |
| b. Resiliency | Poor |
| c. Precision | Excellent |

It is the ability of an RDBMS to support the construction of relational databases that manage data with precision that accounts for the preeminence of relational database use in the business world today. The limitations of relational databases, e.g. their poor presentation and resiliency capabilities are largely managed by use of customized visual front ends, employment of experienced software developers with excellent interface design skills, and the development and deployment of interface standards.

From the above discussion, it is clear that for some types of computer based business databases, e.g. management of documents, a hierarchical database implementation using a HDBMS may be preferable. On the other hand, for the management of complex business financial, sales and human resource information in a single application, a relational database implemented in an RDBMS is preferable.

There are many business situations where both relational and hierarchical database capabilities are required. For example, consider the process of building, deploying and upgrading a primary database application that manages integrated financial and human resources information. This primary application is best implemented in an RDBMS. However to support the development, deployment and maintenance of this primary application, additional supporting database applications may be desired. The first supporting application is a database that stores the relational database design requirements and their evolution over time. The second supporting application is a database that tracks bugs, deficiencies and their resolution of the primary application during its development. The third is a user feedback database that records comments and responses of the primary application users. These three supporting applications are implemented effectively using an HDBMS.

Five Relational Database Management Systems available today are:

RDBMS

- Oracle8
- Sybase SQL Server 11
- Microsoft SQL Server 6.5
- Microsoft Jet Engine 3.5 with Microsoft Access 97 Visual Basic for Applications It is therefore desirable for business organizations to have the capability to develop both relational and hierarchical databases; to use them in a cooperative manner; and to effectively and efficiently maintain the development environments of both.

The Prior Art for using hierarchical and relational databases together fall in three categories. The first, Integration of separate RDBMS and HDBMS Products, maintains separate relational and hierarchical DBMS environments. Additional tools, often provided by third parties, are then used that support the sharing of information between the two environments. The second category, Nonstandard DBMS Extensions, extends the relational DBMS environment through nonstandard Structured Query Language (SQL) extension or other mechanisms to provide a hierarchical capability, or extends the hierarchical DBMS environment to support a relational capability. The third category, Native DBMS Extensions, starts with one environment such as an RDBMS and then constructs the second environment, e.g. the HDBMS, within the first using the first environment's native capabilities. This is done by implementing appropriate data structures such as linked list or trees in the database. Each will be addressed in turn.

Prior Art Category 1. Integration of Separate RDBMS and HDBMS Products

The best example of Prior Art Category 1 is the mechanism of combining Lotus Notes databases with relational databases. Two methods accomplish this. The first is to employ a database connection technology such as an Open Database Connectivity (ODBC) from one to the other and then manipulate the data using the connectivity. For example, an ODBC connection may be made from a Lotus Notes database to an Oracle database. The relational database data may then be accessed and manipulated by executing relational SQL commands generated within the Notes database. Using this approach, data from one database may be altered using data from the other. Using the Lotus Notes programming language NotesScript, the ODBC connection and SQL, data from a Notes document could be inserted into a row of an Oracle table, and data from the relational database can be added to a Notes document.

A second method used in Prior Art 1 is to use third party tools that allow data to be manipulated between the two databases. Products such as Brainstorm's Datalink and Oberon's Prospero do this. Typically, these products map tables or views of the relational database into hierarchical views of Notes.

The methods covered in Prior Art 1 do serve the useful purpose of accessing and manipulating data between hierarchical and relational databases. However, they do have significant disadvantages. First, they require the use of two or more database products. If Notes is used to maintain hierarchical data and Oracle is used to maintain the relational data, then two environments, two applications front ends with different user interfaces and typically two sets of expert developers are required. If a third part tool is also used, then three products are required.

The second limitation of Prior Art 1 is that the data is stored in two separate environments. This introduces various data management problems. A relational database application has one type of user interface while a hierarchical database has a different type. Either the user needs to use both products to maintain both the hierarchical data and the relational data, or a developer or third party product is required to provide an interface in one to manipulate the data in the other. Since interface tools are very different in the two database products, this is difficult to do and causes confusion of users who need to learn and use both interfaces. Furthermore, keeping the data synchronized among the two environments provides special challenges. This is particularly true if the data in each environment is distributed among several locations and replication technologies are used for the data synchronization. Different DBMSs uses different synchronization technologies for synchronizing data. For example, Oracle8, Sybase SQL Server 11, Microsoft SQL Server, Microsoft Jet Engine with Microsoft Access 97 VBA and Lotus Notes 4.5 each has a different way of synchronizing data. These synchronization technologies are very difficult to use together. For example, attempting to manage synchronization between a Notes database and a Microsoft SQL Server database is extremely difficult.

The third limitation of Prior Art 1 is that the two databases have very different data structures and there is no general way to relate the data in these two databases. For example, a hierarchical view in Notes is typically compared with columns of a table or a relational view in the relational database. However, this approach addresses only special cases of data comparison. What is more difficult to do is to relate selected rows of the hierarchical database in Notes to some equivalent structure in the relational database. The reason this is difficult to do is that there doesn't exist a general hierarchical structure in the relational database to make the comparison.

Prior Art Category 2. Nonstandard DBMS Extensions

The second class of Prior Art uses a single product, say an RDBMS. Nonstandard Extensions are then built into the RDBMS to provide a hierarchical capability. For example, Oracle has added two language extensions to its product: CONNECT TO and START WITH. These nonstandard SQL language extensions allow data in a table to have fields that point to a parent record in the same table. With these extensions, appropriate SQL statements will return a SQL view that displays the data from the table in hierarchical form. The references of Prior Art 2 ([Bader], [Simonetti], [Heffernan], [Goldberg, et al], [Cichelli]) use various algorithms and data structures for access and manipulating hierarchical data structures with relational database capabilities.

There are several limitations of this capability. The ORACLE method, which uses the CONNECT TO and START WITH keywords, are not standard SQL and do not exist in other RDBMS products. Therefore, the method is not portable to different products such as Sybase or Microsoft SQL Server. Second, it does not work with multiple tables.

The other approaches that are found in Prior Art 2 are even more restrictive. They require extensive enhancements to the internals of the RDBMS to support the capability. Mainstream products such as Oracle or Microsoft SQL Server are unlikely to implement these approaches.

Prior Art Category 3. Native DBMS Extensions.

This Prior Art category uses data structures and language capabilities of one product (say the RDBMS) to construct a database of the other type (e.g. a hierarchical database). However, the Prior Art methods do not use native SQL to display the hierarchical database, do use awkward constructs that make there use difficult, or limit hierarchical databases to have records that all belong to the same table. The references of Celko cited above present the most powerful methods for building a hierarchical structure using a relational structure. Other approaches used in Prior Art 2 ([Maki, et al], [Nakabayashi]), use linked lists or other mechanism to prove hierarchical capability. However, they are all awkward to implement and in general restrict the hierarchical database to work with only one table.

This concludes the discussion of Prior Art Categories 1 through 3. All of the Prior Art have limitations in common.

They do not deal with multiple relational tables in hierarchical databases they support. They do not support a complete HDBMS that can be used with an RDBMS.

SUMMARY OF THE INVENTION

Accordingly, it is an object of the present invention to provide a capability to provide an improved method and apparatus for implementing a HDBMS. A further object of the current invention is to allow using an RDBMS as the implementing apparatus of the HDBMS. A further object of the current invention is to allow both a hierarchical database and a relational database to be implemented in the same application using a single RDBMS to provide database services. It is a further object to allow SQL to operate on the hierarchical database and to operate on both the hierarchical and relational tables together. It is a further object to provide the HDBMS implementation as an open system, in which a developer can modify and extend the HDBMS's capability using the RDBMS's capabilities.

Other objects, features and advantages of the invention will be apparent from the following figures, description of the preferred embodiments thereof and from the claims.

Briefly, the current invention uses the relational database capably of an RDBMS to construct a full-featured HDBMS. The HDBMS is software that is added to the RDBMS environment. The HDBMS is used to construct a hierarchical database as follows. The hierarchical database data storage tables and their fields, and the root and child conditions are specified by the developer. In the preferred embodiment, the hierarchical database table specifications and root and child condition specifications are stored in tables created in the RDBMS that are part of the HDBMS. Hierarchical view specifications are then specified based on the hierarchical database table specifications. In the preferred embodiment, the hierarchical view specifications are also stored in tables of the RDBMS that are part of the HDBMS.

When the hierarchical database specification is complete, the data storage tables and views are then created in the RDBMS by the HDBMS software. The hierarchical database tables are relational tables satisfying the hierarchical database table specifications. Additional fields, called the hierarchical keys, are added to each hierarchical database data storage table to support the hierarchical structure. These fields are composite keys, unique among all the tables in the hierarchical database. The first component of the hierarchical keys is used to identify hierarchical families in the hierarchical database. The second component of the hierarchical keys maintains the parent/child relationship within the hierarchical family. The component that maintains the hierarchical structure within a hierarchical family is a modification of the system used in a book table of contents.

The hierarchical database is presented to the user using the hierarchical view previously created and stored. An hierarchical view consists of SQL select queries, and are constructed using union queries. Each query in the union query operates on a specific table and presents a hierarchical view of the data desired to be presented for that table. The union of the individual queries then presents the entire set of data to be presented in the hierarchical view.

In the preferred embodiment, the functions of insert root, insert child, update and delete are all implemented using SQL available in the RDBMS. The insert child function requires the user first to select a parent row from a hierarchical view.

The user then selects a child table consistent with the specified child conditions specification to be used for adding a child row.

The capabilities of this invention have several features that make it very attractive for use in database development. First, the HDBMS it provides is an open system. It is implemented in an RDBMS using the RDBMS's native capabilities. It can therefore be modified and enhanced by the developer to meet specific needs. This is not possible by Prior Art 1 or 2 since they both use closed systems.

Second, since the hierarchical database data storage tables and any relational database tables exist in the same RDBMS product, and SQL is used to maintain both the hierarchical and relational data; the data can be shared and integrated as appropriate. For example, a lookup table containing ZIP codes and their corresponding city and state values could exist in a relational database implemented in the same application as a hierarchical database. That table could be used to look up city and state values when the ZIP code is supplied in both a hierarchical table and the relational table. Similarly, a union query could be used to find all persons in the application data whose name starts with "S", where the data may reside in either a relational database table or a hierarchical database table.

BRIEF DESCRIPTION OF THE DRAWINGS

The forgoing and other objects of this invention, the various features thereof, as well as the invention itself, may be more fully understood from the following description, when read together with the accompanying drawings in which:

FIG. 1A shows a relational view of seven tables of a hierarchical database for the Leads Tracking Example;

FIG. 1B shows a relational view of root and child conditions for the Leads Tracking Example;

FIG. 1C shows a relational view of fields of the seven tables for Leads Tracking Example;

FIG. 3B shows field definitions for tables of FIG. 3A;

FIG. 5B shows user entered data specifying the fields for seven tables for the Leads Tracking Example;

FIG. 7A shows user entered hierarchical view specification for the Leads Tracking Example;

FIG. 7B shows user entered hierarchical view details specification for the Leads Tracking Example;

FIG. 8A shows code using Microsoft Visual Basic for Applications (VBA) and Microsoft Access Data Access Objects (DAO) for creating the hierarchical database data storage tables based on the hierarchical database data storage table specifications;

FIG. 8B shows user entered data and automatic hierarchical key generated data for seven tables of the Leads Tracking Example default hierarchical view;

FIG. 9A shows nine rows of the default hierarchical view for the Leads Tracking Example;

FIG. 9B shows a second embodiment for implementing the hNode hierarchical key for maintaining the hierarchical structure within a hierarchical family.

FIG. 9C shows the default hierarchical view SQL select query for the Leads Tracking Example;

FIG. 9D shows the hierarchical view SQL select query detail for the Leads Tracking Example;

FIG. 12B shows Update Algorithm SQL example;

FIG. 14A shows SQL ordering root tables of Lead Tracking Example by first and last name;

FIG. 14B shows the hierarchical view SQL of example;

FIG. 14C shows the hierarchical view SQL ordering families by first and last name;

FIG. 14D shows the rows generated by the hierarchical view in FIG. 14C satisfying user requested data.

BRIEF DESCRIPTION OF THE PREFERRED EMBODIMENTS

INTRODUCTION

Figure 1D:
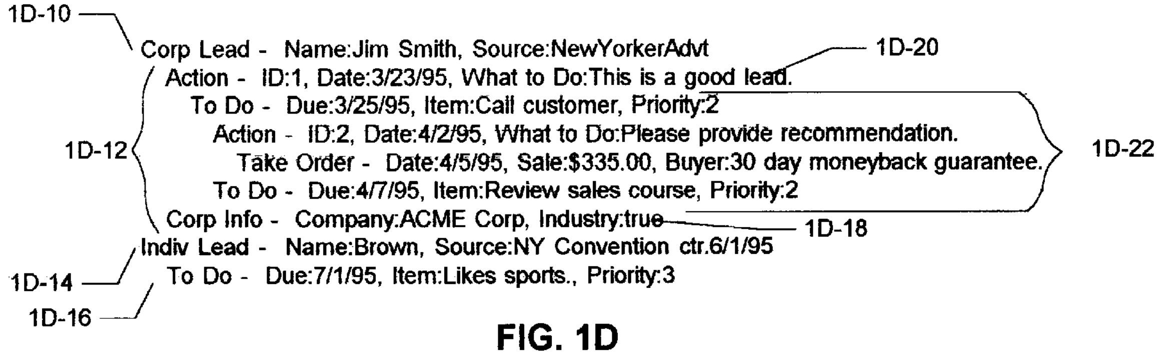
FIG. 1D shows the hierarchical database hierarchical view for Leads Tracking Example.

Microsoft Access 97 with its VBA code, together with the Microsoft JET engine that comes with Microsoft Access, has been chosen as the RDBMS and database front end used to demonstrate this preferred embodiment, but the method and apparatus applies equally well to any RDBMS.

FIGS. 1A through 4 present the overview of what the invention does and how it does it. The remaining FIGS. 5A through 15 present the details of the invention.

FIGS. 1A THROUGH 1E

DEFINITION OF A RELATIONALLY-BASED HIERARCHICAL DATABASE

A hierarchical database stores data as "rows" where each row is either a root of a hierarchical family in the hierarchical database, or a child of the previous row of the hierarchical database. The term row is used loosely here as a set of data storage elements containing user-entered data. Row has a more precise meaning in a relational database, which is the subject of this invention.

A hierarchical database is defined here as a database that satisfies the following conditions:

a. It is a hierarchical database b. Each row of the hierarchical database is a row from a table selected from a set of previously created set of hierarchical database data storage tables in the RDBMS c. New rows added to the hierarchical database must satisfy specified root conditions and child conditions A Leads Tracking hierarchical database example is presented in FIGS. 1A through 1E. This example will be used for illustrative purposes throughout this brief description. It will be referred to as the Leads Tracking Example.

In the following, the term "hierarchical view" will be used to describe queries that display the rows of a hierarchical database in a standard form. The term relational view will refer to a select query applied to tables in the RDBMS in the usual relational database sense.

FIG. 1A shows a relational view of the seven tables used in the Leads Tracking Example. Each table in FIG. 1A is a table in the RDBMS. The seven tables of the example include a Corp Lead table (leads associated with a corporation), an Indiv Lead table (leads associated with an individual), a Corp Info table, a Contact Info table, an Action table, a To Do table and a Take Order table. The figure shows the numerical ID associated with each table and the table name presented to the user.

FIG. 1B gives a relational view of the root and child conditions that apply to the seven tables of FIG. 1A for the example. These rows specify which tables are permitted to be associated with each parent. The entry "<root>" 1B-10 in the parent column in FIG. 1B indicates that the table entry in the child column can be used to form a new hierarchical family. Two tables, Corp Leads and Indiv Leads 1B-12 are used for entering a row at the root of a hierarchical family. This is used for initiating the tracking of a new lead in the hierarchical database. Each of these two root tables has multiple choices for children. The Corp Lead table has four table choices 1B-14 for entering its children (Tables 3, 4, 5, and 6). The Indiv Lead table has only two table choices 1B-16 for entering children (Tables 5 and 6). The Corp Info table 1B-18 (Table 3) has only itself as a child. A child could be used for presenting updated corporation information. The Take Order table (Table 7) is not shown in the FIG. 1B. This indicates that it is not allowed to have children, and denotes the successful completion of the Leads Tracking process for this hierarchical family culminating in a sale.

FIG. 1C gives a relational view of the data storage fields of the tables in this Leads Tracking Example. The Corp Lead table has six fields 1C-10. The fields are LeadSource (where the lead came from, e.g. magazine advertisement, direct mail response), LeadDate (the date the lead was received by the tracking system), LeadFullName (the name of the potential customer identified as the lead contact), LeadPhoneNo (the telephone number of the lead contact) LeadMailingAddress (the mailing address (street, city, state, zip where the lead can be sent information), and LeadCompany (the company the lead works for). Table 2 has five fields 1C-12, and Tables 3 through 7 have 10, 8, 6, 5 and 9 fields respectively.

FIG. 1D shows a hierarchical view of nine rows of data entered into the hierarchical database in the Leads Tracking Example. Each row in the view represents data the user entered into one of the seven tables. The view displays a selected subset of fields of the table that support the row, with added text to make the view easy to read. There are two families represented in the hierarchical database as indicated in FIG. 1D. The first hierarchical family with root (1D-10) has six descendents of the root (1D-12) and the second hierarchical family has a root entry (1D-14) with one descendent (1D-16). In the visual representation of the hierarchical database shown in FIG. 1D, each first born of a parent occurs immediately beneath the parent and is indented 1D-20, 1D-16. Each sibling of a first born (e.g. 1D-18) occurs immediately below its next older sibling 1D-20 and is at the same level of indentation as its next oldest sibling if the next oldest sibling's children (1D-22) are ignored. Each row is consistent with the root and child conditions given in FIG. 1B.

Figure 1E:
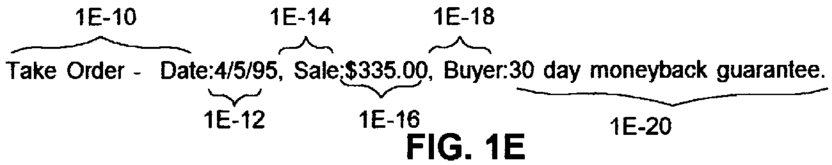
FIG. 1E shows detail of the hierarchical database hierarchical view for Leads Tracking Example.

FIG. 1E gives details of how a row of a hierarchical view is constructed from data in the tables of the hierarchical database.

1E-10 Take Order—Date:

This is text identifying the table used, and the first data field called "Date:"

1E-12 Apr. 5, 1995

This is the value of date data stored in the database.

1E-14 Sale:

Identifies the data field that follows

1E-16 $335.00

The sale price stored in the database.

1E-18 Buyer:

Identifies the data field that follows

1E-20 30 day moneyback guarantee

The comment entered into the buyer comment field.

The actual hierarchical database of the Leads Tracking Example has nine rows of data, just like FIG. 1D. However, the row of the hierarchical database contains data from all the fields of the table that supports each row. The full hierarchical database with all fields is normally not displayed in hierarchical view form i.e. one line per root or child table without the descriptive text. Displaying all the fields of a table on a single line is usually not possible due to space limitations. Furthermore, displaying all the fields of the rows of a hierarchical database without descriptive text would be difficult to understand because different rows contain data from different tables.

FIG. 2

IMPLEMENTATION OF INVENTION

Figure 2:
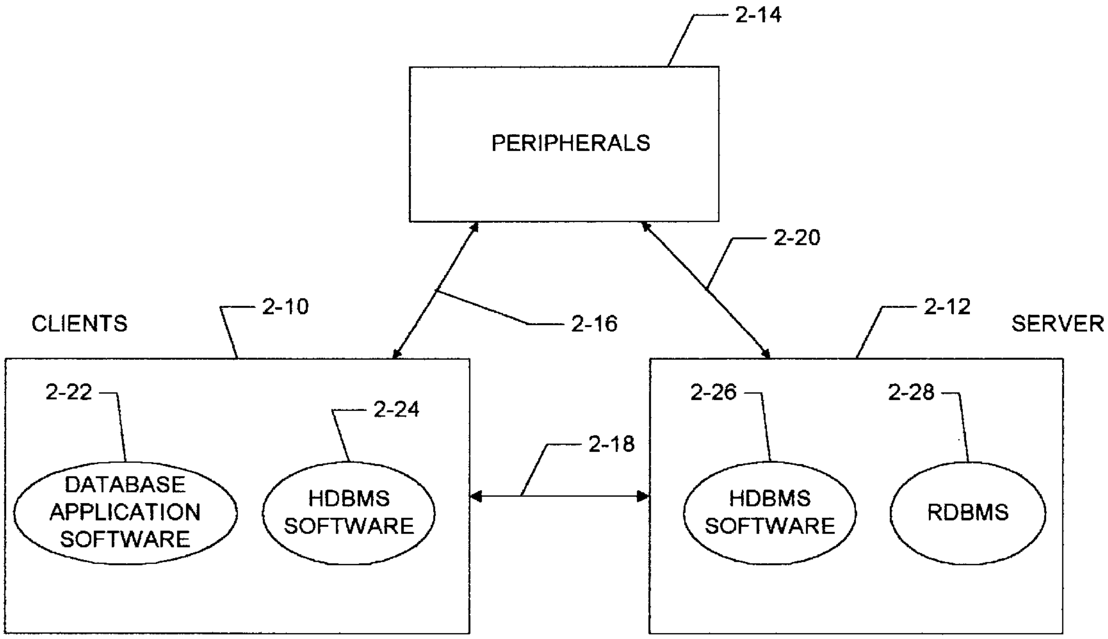
FIG. 2 shows apparatus of this invention.

FIG. 2 shows the apparatus for implementing the invention in this preferred embodiment. The invention employs a computer system 2-10, 2-12, 2-14, 2-16, 2-18, 2-20. This typically includes one or more client computers 2-10 for user input and software output as well as application software storage and execution. It contains a server computer 2-12 for storing the relational database management system software and data and executing RDBMS functions, communication means such as networks 2-16, 2-18, 2-20 to connect the computer system components, and peripheral devices 2-14 such as printers and tape backup.

The database application software 2-22 represents a database application front end such as Microsoft Access 97, Microsoft Visual Basic 5, Borland Delphi 3 or Sybase Powerbuilder 5.0. This is used for receiving user-inputted data from the client computer and outputting it to the HDBMS software and to the RDBMS. It is also used for receiving information form the HDBMS software and RDBMS for presentation to the computer system output devices to display data and software output to the user.

The HDBMS Software 2-24 and 2-26 is the hierarchical database management system software of this invention. It specifies the hierarchical database data storage tables used for storing the hierarchical database data, and creates and stores these tables in the RDBMS. It contains the root conditions and child conditions used to manage the functions of adding a root row the hierarchical database and adding a child row of a selected parent row. It is also used to create and store the hierarchical views to display the data in the hierarchical database in a form that displays families in the hierarchical database contiguously and displays children in each hierarchical family below their parent.

The HDBMS provides a mechanism for maintaining the hierarchical structure of the database using the hierarchical keys included in the hierarchical database data storage tables. It also provides the functions of insert root row, insert child row, update row and delete row and its descendents, and retrieve requested data for managing data in the database and presenting it in a user friendly form to the user.

The HDBMS software in a commercial product would incorporate the HDBMS software as an add-on product to the RDBMS product and depending on the implementation, an add-on product to the database application also.

The RDBMS block 2-28 is the relational database management software such as Microsoft SQL Server, the Microsoft Access Jet engine with Visual Basic for Applications programming language, or ORACLE8. This software provides the relational database capability that the HDBMS uses. This includes storing tables specified by the HDBMS, executing SQL action queries and dynamic SQL generated by code in the HDBMS and database application.

The apparatus may be implemented in a client server environment. In this case, the RDBMS will be stored on the server side. The HDBMS software may reside solely on the server or distributed between the client and the server. Hierarchical view SQL queries may be implemented as stored views in the RDBMS or elsewhere in the system. User input and output and the database application are managed on the client side.

The Microsoft Access preferred embodiment is a file server database, where the HDBMS software and the RDBMS software may reside on a single computer.

FIGS. 3A AND 3B

DATA STRUCTURE FOR SPECIFYING A HIERARCHICAL DATABASE

Figure 3A:
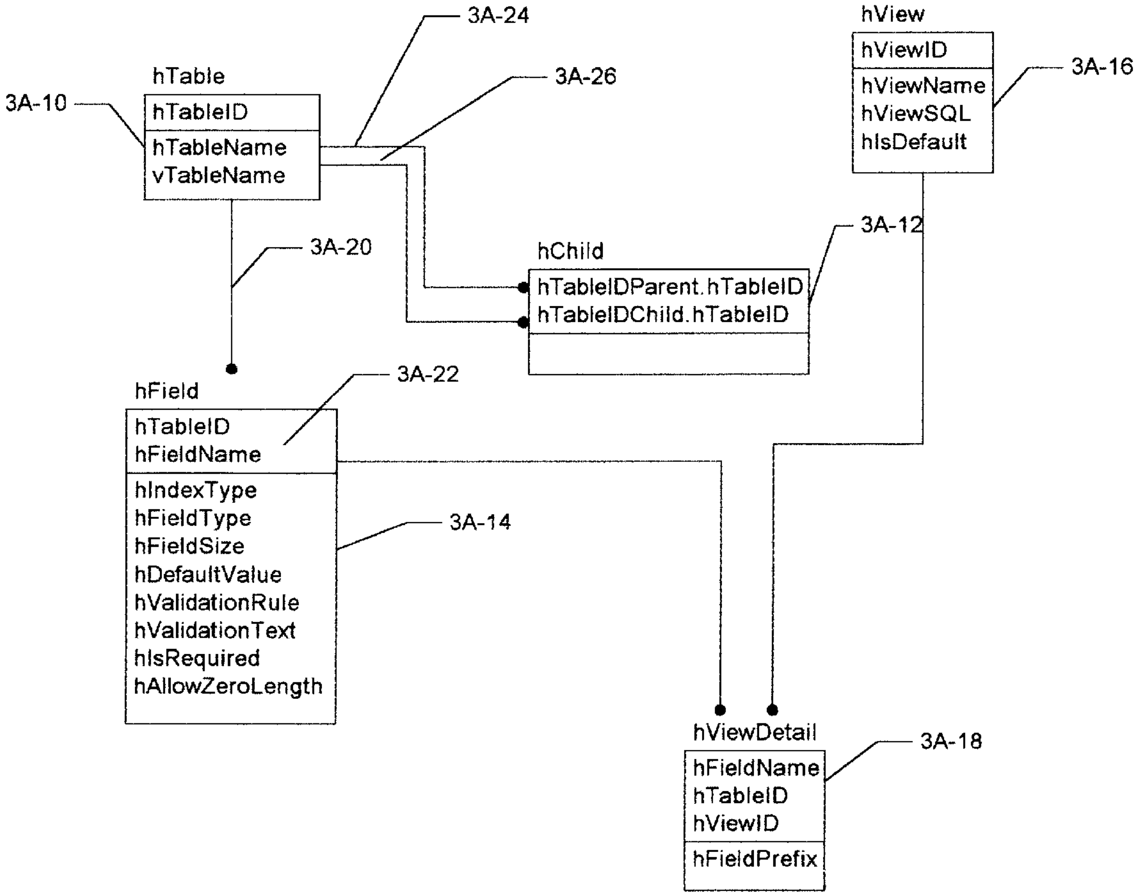
FIG. 3A shows entity-relation-attribute diagram for the preferred embodiment.

FIG. 3A gives the preferred embodiment of a data structure used to specify and implement this invention. The structure is composed of tables stored in the RDBMS. The figure is presented in standard Entity-Relationship-Attribute form [Bruce]. The tables shown in FIG. 3A are the tables the database developer uses to design the structure of the hierarchical database. Items 3A-10 through 3A-26 give the tables, fields, primary keys and relationships of the diagram.

3A-10 hTable

The rows of this table include the numeric ID of each table in the hierarchical database and the table names. This corresponds to FIG. 1A in the Leads Tracking Example

3A-12 hChild

The table storing the root conditions and the child conditions.

3A-14 hField

The fields and their properties for each of the tables in hTable.

3A-16 hView

The hierarchical views stored in the database

3A-18 hViewDetail

The tables and fields used in each hierarchical view and the descriptive text associated with the view's displayed fields.

Figure 4:
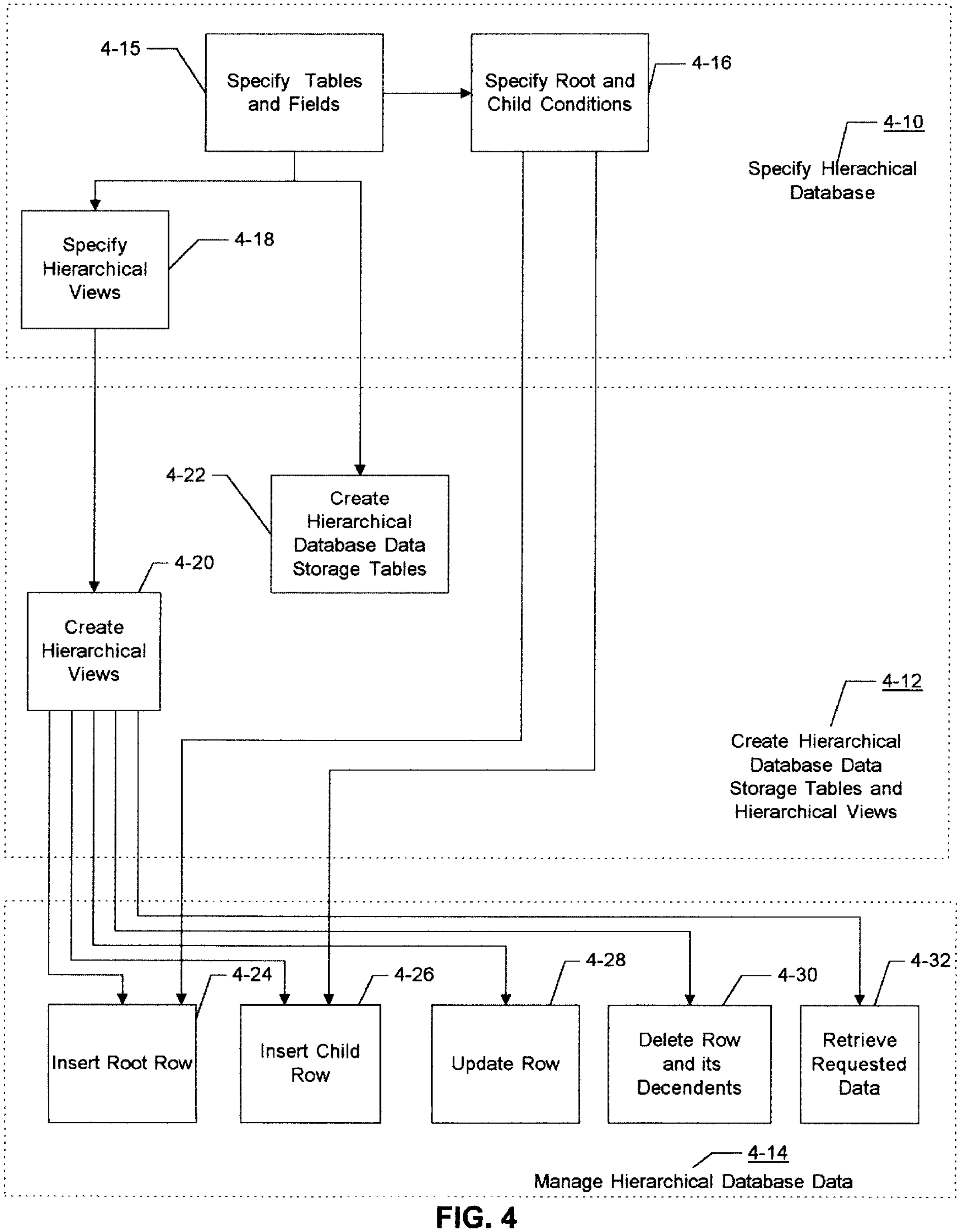
FIG. 4 shows the method overview.

The field hViewSQL of 3A-16 is set to null during the development stage and are computed automatically by the invention during the Create Hierarchical Database Data Storage Tables and Hierarchical Views stage (see 4-12) of FIG. 4.

The connectors such as 3A-20 indicate that there is a one to many to relationship from the one side of the relationship (hTable) to the many side (hField). This means that one row of hTable corresponds to zero or more rows of hField. The items in the top box of the tables e.g. 3A-22 are the primary key(s) of the table. Their values for a row uniquely identify the row.

The two connectors 3A-24 and 3A-26 indicate that each of the two primary key elements in 3A-12 matches a hTableID key in 3A-10.

The usage of these tables will be explained when the blocks in the processing are explained in the next sections.

FIG. 3B gives the description of the fields in the tables in FIG. 3A.

3B-10 FieldName

The name of the fields in FIG. 3A.

3B-12 Type

The field type. For the preferred embodiment using Microsoft Access, the allowable values are: 1-Boolean; 2-byte; 3-integer; 4-long; 5-currency; 6-single; 7-double; 8-date/time; 10-text (max length 255 char); 11-OLE; 12-memo

3B-14 Length

The max number of characters for text fields.

3B-16 Description

The field description.

FIG. 4

PROCESSING OVERVIEW

FIG. 4 give the steps required to specify, implement and use a hierarchical database using this invention.

The upper third of FIG. 4, Specify Hierarchical Database 4-10, denotes the process where the developer enters data into the fields of the tables defined in FIG. 3A. The data entered by the developer specifies the structure of the hierarchical database to be implemented.

4-15 Specify Tables and Fields

This block specifies the tables 3A-10 and their fields 3A-14, which store the rows of data of the hierarchical database.

4-16 Specify Root and Child Conditions

This specifies the conditions, referred to as root conditions and child conditions 3A-12 for adding root and child rows.

4-18 Specify Hierarchical Views

This block involves entering data in hView 3A-16 and hViewDetail 3A-18, which specify the hierarchical views to display the hierarchical database.

The second part of FIG. 4, Create Hierarchical Database Data Storage Tables and Hierarchical Views 4-12, are processes implemented automatically in software that converts the hierarchical database specification into a working application. This includes the two blocks Create Hierarchical Views and Create Hierarchical database Data Storage Tables.

4-20 Create Hierarchical Views

This block creates a SQL Select Query for each row of table hView 3A-16. The result is stored in the hViewSQL field of 3A-16.

4-22 Create Hierarchical Database Data Storage Tables.

This block creates the hierarchical tables that store the rows of data in the hierarchical database. One table is generated for each row in 3A-10. The tables created have the fields and properties as given in 3A-14. They also have additional fields, the hierarchical keys of the hierarchical database, which will be described later.

The third part of FIG. 4, Manage Hierarchical Database Data 4-14, indicates the four data manipulation operations and one selection operation users perform to maintain the data. These are described as follows:

4-24 Insert Root Row

This block allows the user to insert a root row in the hierarchical database, initiating a new hierarchical family.

4-26 Insert Child Row

This block allows the user to insert a child row in the hierarchical database based on a selected parent row.

4-28 Update Row

This block allows the user to update a root or child row of the hierarchical database

4-30 Delete Row and Descendents

This block allows the user to delete a row and its descendents.

4-32 Retrieve Requested Data

This block provides a general capability to run RDBMS select queries in the hierarchical databases to display selected information from the hierarchical database.

The details of these blocks follow.

FIGS. 5A AND 5B

SPECIFY TABLES AND FIELDS (4-15)

Specify Tables and Fields 4-15 is the process the hierarchical database developer uses to specify the hierarchical database data storage tables and fields that are used to define the hierarchical database structure. The database developer, working with the business needs of the users specifies these tables and the fields in these tables. A specification is a set of rows of data entered into hTable 3A-10 and hField 3A-14.

Figure 5A:
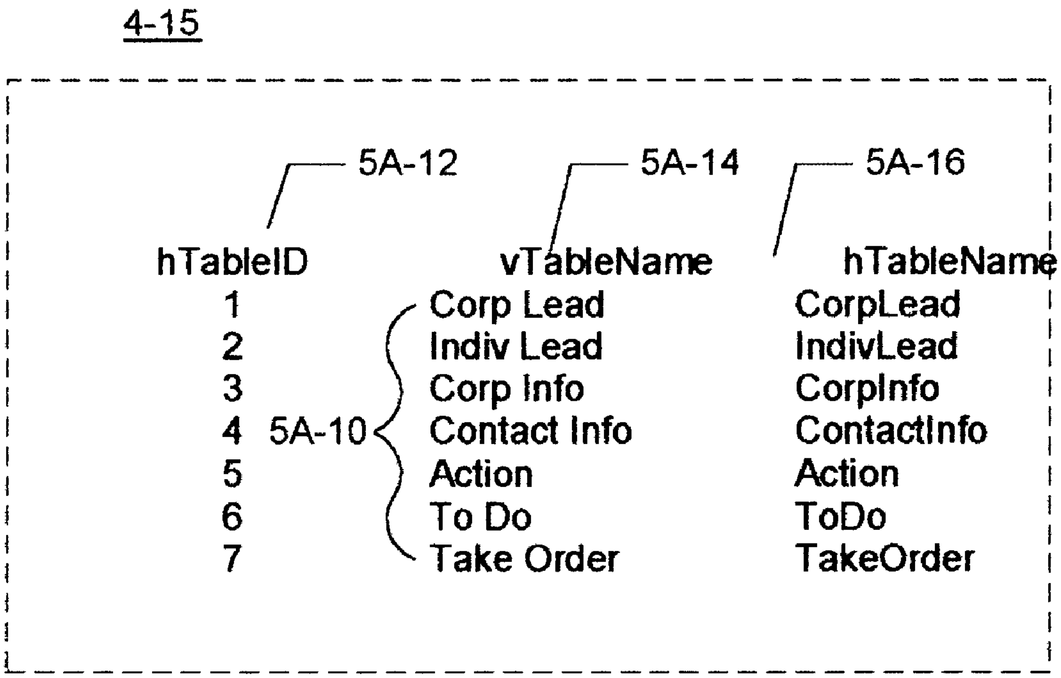
FIG. 5A shows user entered data specifying the seven tables for the Leads Tracking Example.

FIGS. 5A and 5B give the results of this block for the Leads Tracking Example of FIG. 1. FIG. 5A shows the data entered to define the seven tables 5A-10. Column hTableID 5A-12 gives the integer designation of the table. This is the primary key for hTable as indicated in 3A-10 of FIG. 3A. Column vTableName 5A-14 gives the names of the tables that are presented to the user in hierarchical views. Column hTableName 5A-16 gives the names of the tables that that are created to store the hierarchical data. These tables are created in 4-22 of FIG. 4. FIG. 5A gives the actual data entered into the tables while FIG. 1A shows a relational view of the table, i.e. column 5A-16 is omitted in FIG. 1A.

FIG. 5B shows the data entered into table hField to define the fields of the seven tables defined in FIG. 5A. The six fields specified for Table 1, the Corp Lead Table, are shown in 5B-10. The first field in this table is named LeadCompany in column 5B-12. It is of type text 5B-14, 3B-20, and has maximum length of 50 characters 5B-16. The default value 5B-18 is not defined. The index type of this field is 0 5B-20, i.e. it is not indexed 3B-18. No validation rule 5B-22 or text 5B-24 is applied to this field, and a zero length string is not allowed for this field 5B-26. Not shown due to space limitations in the diagram is the isRequired field.

FIG. 6

SPECIFY ROOT AND CHILD CONDITIONS (4-16)

Figure 6:
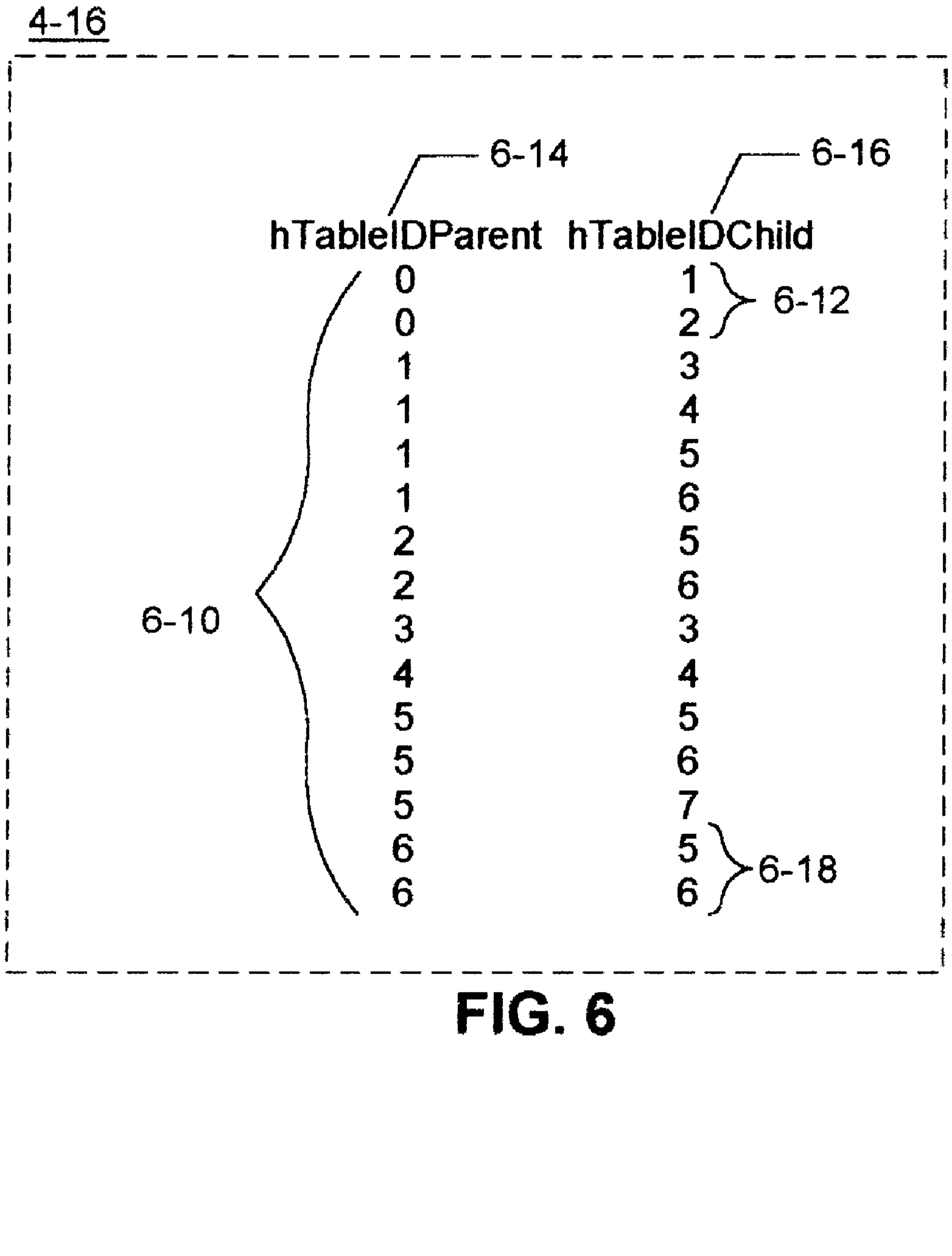
FIG. 6 shows user entered data for specifying the root and child conditions for the Leads Tracking Example.

In this preferred embodiment, the block Specify Root and Child Conditions 4-16 of FIG. 4 requires the developer to define the conditions such that a new root row, or a new child row of a selected parent row, can be added to a specific table. In this preferred embodiment, data is entered into the rows of table hChild 3A-12. FIG. 6 gives the rows of the hChild table 3A-12 for the FIG. 1 Leads Tracking Example. FIG. 6 gives the actual data entered into the table while FIG. 1B gives a relational view of the table presented in a more presentable format.

The rows of the hChild Table 6-10 specify the allowable child tables for each parent table. The column hTableIDParent 6-14 gives the parent column and hTableIDChild 6-16 gives the child column. By convention, the root rows are given by the hTableIDChild column of the rows of hChild where hTableIDParent value is 0 6-12. The ToDo table 6-18 (Table 6) illustrates child conditions. There are two children tables (Tables 5 and 6) that may be used to create a new child row when the selected parent row belongs to the ToDo table.

In a second preferred embodiment, root and child conditions are specified in an algorithm implemented in code. The algorithm may have various inputs such as the user ID requesting the create child or root table, or the value of one or more fields in the parent table. The basic requirement of a root and child conditions algorithm is that it returns a yes/no value for each candidate root table or for each child table for selected parent row.

FIGS. 7A AND 7B

SPECIFY HIERARCHICAL VIEWS (4-18)

The developer specifies hierarchical views for displaying the hierarchical database in a presentable format. A hierarchical view is a SQL select query that displays of the data in the hierarchical database with one row displayed for each row of data in the hierarchical database. The output of this block are SQL queries that creates the hierarchical views, one SQL query for each row of table hView 3A-16. The hierarchical view query is stored in the field hViewSQL in table hView. In this preferred embodiment, the user enters one or more rows of data into the hView table 3A-16 of FIG. 3A and then enters related rows into the hViewDetail table 3A-18. With the hView and hViewDetail tables specified, the SQL expression that generates the hierarchical views is created automatically in 4-20 and inserted in the hViewSQL field in table hView.

FIG. 7A gives the values of the hView table for the Leads Tracking Example in FIG. 1. Only one hierarchical view 7A-10 is specified in this example. Note that the hViewSQL field 7A-12 is empty. Its content is determined later in 4-20.

FIG. 7B gives the data entries for table hViewDetail 3A-18 for the Leads Tracking Example. The hViewID column 7B-10 identifies the view number. Since there is only one hierarchical view, all entries are 1. Column 7B-12 gives the table integer identifier hTableID. This integer identifies the table that the row of the hierarchical view is created for. 7B-18 shows two rows for Table 1.

These are the fields LeadFullName and LeadSource found under column hFieldName 7B-14 for Table 1. These two fields will be used to display the rows of the hierarchical view for rows whose data is stored in Table 1. The FieldPrefix column 7B-16 contains text to display in the row preceding the data field. The values "Name:" and "Source:" in the hFieldPrefix column 7B-16 are descriptive text that is displayed preceding the data values of field LeadFullName and LeadSource for this row using Table 1 of the hierarchical view.

In a second preferred embodiment, additional fields are added to the hViewDetail table 3A-18. Fields such as format, which specifies the format of the field, and NumChar, which specifies the maximum number of characters to be displayed in a text field, are included.

In a third preferred embodiment, the developer constructs the hierarchical view manually by composing the hViewSQL expression directly. The developer determines which fields in each row are displayed, what descriptive text is included, and what row indentation is used in the SQL statement.

FIGS. 8A AND 8B

CREATE HIERARCHICAL DATABASE DATA STORAGE TABLES (4-22)

The block Create Hierarchical Database Data Storage Tables 4-22 creates the tables specified by the data entered in hTable 3A-10 and hField 3A-14. The term hierarchical database data storage tables is used to refer to tables that have the data storage fields with properties defined by the developer-entered rows in 3A-14. For the Leads Tracking Example in FIG. 1, seven tables are created.

The actual tables created by 4-22 have additional fields to those specified in 3A-14. These are unique keys of each table that manage the hierarchical parent/child relationships. These fields, called collectively the hierarchical keys, are named hKey and hNode. hKey and hNode in this preferred embodiment are two text fields and are uniquely indexed keys of each table.

FIG. 8A shows the Microsoft Access code that creates the hierarchical database data storage tables in the preferred embodiment. The logic loops through the tables of hTable. For each such table, it creates a TableDef object "tbl" with name hTableName from the current row of hTable 3A-10. It then creates the fields hKey and hNode, and then loops through the fields of hField for that table, appending the new field to TableDef with the properties taken from the properties in hField. When all the fields for that table are processed, the TableDef object tbl is appended to the TableDef collection, creating the table. The next table is then processed. The code is now described.

8A-10 dimensions the objects to be defined later, and establishes the QT string used for inserting quote characters when processing text variables.

8A-12 creates an object variable for the current database.

8A-14 opens the recordset of all rows of hTable.

8A-16 starts iterating through the rows of hTable.

8A-17 opens a recordset of the rows of hField of table hTable.

8A-18 creates a TableDef object tbl with name rsTable-!hTableName. This is the table name from the current row of rsTable.

8A-19 checks that there is at least one row in rsF

8A-20 creates the field hKey, assigns properties to it and appends it to tbl

8A-22 creates the field hNode, assigns properties to it and appends it to tbl.

8A-24 starts looping through the fields of hField

8A-26 creates the next field from the current row of rsF with the properties given in rsF. If the field's property does not apply to the datatype the line on error resume next ignores it instead of raising an error.

8A-28 iterates through the next row.

8A-30 When 8A-24 detects an end of file, all fields for current table have been processed. The processing then jumps to 8A-30, which creates the table.

8A-32 When fields for given table are completed this code is executed and the next table is processed. When an end of file is reached for rsT, all tables have been processed and the code terminates.

FIG. 8B shows the seven tables that are created by 4-22, using the data entered in 3A-10 and 3A-14 for the Leads Tracking Example. It also shows nine rows of data entered into the tables. 8B-10 shows the ID and name of the Table 1, the CorpLead table 8B-20. The value of hKey is A_0001 8B-12. The value of hNode is 0000 8B-14. These fields determine the hierarchical structure of the rows in the database. The remaining fields in Table 18B-17 are as follows. LeadSource contains NewYorkerAdv, however in the printout the last two characters are truncated. The field LeadDate contains Mar. 17, 1995; LeadFullName contains Jim Smith, etc. The properties of each field of Table 1 are the developer entered values. From the rows 5B-10 of FIG. 5B, the properties of the fields are shown. For example, LeadCompany is a text field of type 10 (text) LeadDate is a date field. Similarly:

8B-22 is the IndivLead table and it holds one row of data for the Leads Tracking Example.

8B-24 is the CorpInfo table and it holds two rows of data 8B-26 is the ContactInfo table and it holds zero rows of data. Observe that in FIG. 1C, there are no rows in the hierarchical view supported by the ContactInfo table.

8B-28 has two rows of data for the Action table 8B-30 has 3 rows of data for the ToDo table 8B-32 has one row of data for the TakeOrder table. The combined set of tables hold nine rows of data, which corresponds to the nine rows in the hierarchical view of FIG. 1C.

The actual use of the fields hKey and hNode to maintain the hierarchical database is deferred to the next section where generation of hierarchical views is discussed.

In a second preferred embodiment, the Create Hierarchical Database Tables are created using dynamic SQL. A CREATE TABLE SQL command is generated dynamical in code by iterating through tables 3A-12 and 3A-16. The SQL commands are the executed, generating the tables.

FIGS. 9A THROUGH 9E

CREATE HIERARCHICAL VIEWS CONSTRUCTION (4-20)

The Create Hierarchical Views block 4-29 creates views for displaying the rows of the database. The hierarchical structure of the hierarchical database is maintained by using the composite keys (hKey, hNode) created in each table in the hierarchical database data storage tables. This section describes how these keys determine and maintain the hierarchical structure in the hierarchical database for families, and how hierarchical views are constructed and generated.

FIG. 1C shows the nine rows of data generated by the hierarchical view of the Leads Tracking Example database as presented to the user. There are nine rows in the view, but only one column. FIG. 9A shows the same 9 rows of the database, but with four columns instead of one. The last column 9A-10, named View, has the same rows of data as the single column in FIG. 1C. The first two columns hKey, 9A-12 and hNode 9A-14 are used to order the rows in the correct hierarchical order. The third column hTableID 9A-16 shows the table ID that supports the row.

Comparing FIG. 9A to FIG. 8B, a one-to-one mapping of the rows of the Leads Tracking Example hierarchical view onto the rows of the hierarchical database data storage tables can be made. Specifically:

9C-18 maps to the only row of 8B-20

9A-20 maps to the first row of 8B-28

9A-22 maps to the first row of 8B-30

9A-24 maps to the second row of 8B-28

9A-26-maps to the only row of 8B-32

9A-28 maps to the second row of 8B-30

9A-30 maps to the only row of 8B-24

9A-32 maps to the only row of 8B-22

9A-34 maps to the third row of 8B-30

The fields hKey and hNode are a unique composite key for each of the seven tables. They are also unique pair across all the tables. They are the unique identifiers of the hierarchical database rows as presented in the hierarchical view of FIG. 9A. In the preferred embodiment, the hierarchical family key hKey is a text field with six characters. The first character from the left is a capital letter, selected from the characters from A through Z. The second character is an underscore ("_") and the remaining 4 characters are zero-filled integers. The mechanism for assigning the key values in this preferred embodiment is just an example; any assignment algorithm that assigns a unique key to each hierarchical family is acceptable. In this preferred embodiment there is a getNextKey function which when called will return a new key for starting a new hierarchical family.

The first hierarchical family 9A-35 has seven members and is identified by the key A_0001. The second hierarchical family 9A-36 has two members and is identified by the hierarchical family key A_0002.

The field hNode determines the ordering within each hierarchical family. In this preferred embodiment, each entry in hNode consists of one or more strings of N digits, where N is developer defined. In the Leads Tracking Example, N is set to 4. If there are more than one string of N digits, they are separated by the underscore symbol "_". The level of a node is defined by the number of N digit strings, e.g. level=(len(hNode)−N)/(N+1). In this expression the function len() returns the number of characters in its argument. Therefore the level of "0000" is (len("0000")−4)/5=(4−4)/5=0. The level of the string "0000_0002_0003" is (14−4)/5=2. The level for this embodiment may be computed by counting the number of underbars "_" in the string.

Each family of the hierarchical database consists of a root node and its descendents 9A-35, 9A-36. A root row in this preferred embodiment is all rows that have hNode="0000" 9*a*-18 and 9*a*-32. The children of a given row are all row that have the same value of hKey and have an hNode string that is composed of the hNode string of the parent row and a string of length 5 appended to it. The descendents of a parent row are all children of the parent row and all children of the descendents of the parent row. In FIG. 9A the children of 9A-18 are 9A-20 and 9A-30. The descendent of 9A-22 are 9A-24, 9A-26 and 9A-28. For the preferred embodiment, this is equivalent to all rows such that that the hkey value is the same as the parent, and the hNode value starts with the hNode value of its parent and has an additional string appended.

In a second preferred embodiment, N is set to 2, the underscore symbol not used, and the characters takes values in all distinguishable alphanumeric characters supported by the database. Distinguishable means not equal in the database comparison sense. In Microsoft Access, the character "a" equals the character "A" in database comparison. In the second preferred embodiment, level is given by the formula (len(x)/2−1), and the first child of hNode of "00" is "0000". The value of N and the characters used in the representation determines the number of children and number of levels supported by the database. For example in the first embodiment, n=4, the symbol "_" used, and characters must be a numeric digit. There are therefore (256−4)/5=50 levels supported and each root may have up to 10*10*10*10=10,000 children. In the second embodiment, N=2 and there are 10 digits and 36 letters A–Z for each digit. In this case, the number of levels is: 256/2=128 levels. Each row is allowed up to (36+10)* (36+10)=2116 children.

In a third preferred embodiment, the hNode is represented without the leading zeroes unless they are needed to sort properly. The underscore symbol is replaced by a period. FIG. 9B illustrated this concept.

9B-10 and 9B-12 shows the columns hKey and hNode for the hierarchical database shown in FIG. 9A. The rows sort as shown, preserving the hierarchical structure. 9B-10 represents the first hierarchical family and 9B-12 represents the second hierarchical family.

9B-14 and 9B-16 shows a different hierarchy. The first hierarchical family 9B-14 has ten first generation children, two second generation children and one third generation child. The sorting order is correct as shown. The second hierarchical family 9B-16 has one child.

9B-18 and 9B-20 show the hKey and hNode rows, properly constructed and sorted when an $11^{th}$ child is added to the hierarchical family. To preserve the sort order, all the first generation children of the first hierarchical family and their descendents have the field following the first period expanded to length two with a leading zero added if required. The second hierarchical family does not have this leading zero added since it is not required for sorting. The same concept applies for other generations.

This third preferred embodiment is easiest to read and dynamically allocates the node representation for more efficient storage. However whenever a situation such as an $11^{th}$ first generation child is added, all the values of hNode of all siblings and their descendents of the $11^{th}$ first generation child must be modified as indicated.

The field hNode displays the data in appropriate sort order and maintains the parent/child relationships. Given any row of a hierarchical database with hKey and hNode having values (k, n), then the children of this row have the same key k and have the strings "_0000" appended to n for the first child, "_0001" appended to n for the second child, etc. In FIG. 9A, the children of the root node 9A-18 belong to the hierarchical family defined by the key A_0001 and have two children given by 9A-20 and 9A-30. The row in the hierarchical family with hNode value "0000_0000 9A-20 has child "0000_0000_0000" 9A-22. A second child, if it existed, would have hNode value "0000_0000_0001". Using the standard alphanumeric ordering of the fields (hKey, hNode), the rows of the view in FIG. 9A order the data in the same way as the visual representation given in FIG. 1D.

Indentation of the levels is achieved by using the function String(3*level(hNode), s). The function concatenates the string s the number of times indicated by the first argument. For example, let s="", the string consisting of a space character. Then the function string(3*level("0000"), "") returns the empty string). String(3*level("0000_0000"), "") returns" ", the string with three spaces. String(3*level ("0000_0000_0000"), "") returns" ", the string with six spaces.

The hierarchical view displayed in FIG. 9A is determined from the nine rows of data in the seven tables of FIG. 8B and the hViewDetail specification of FIG. 7B. FIG. 9C gives the SQL expression for generating the hierarchical view shown in FIG. 9A. It is composed of the union (e.g. 9C-24) of the seven table SQL queries shown in 9C-10, 9C-12, 9C-14, 9C-16, 9C-18, 9C-20 and 9C-22. Each of the seven table SQL queries applies to one of the seven tables. For example, 9C-10 applies to the CorpLead Table 9C-38 and 9C-12 applies to the IndivLead table 9C-40. The last line of the SQL expression 9C-36 orders the entire result by hKey, hNode FIG. 9D gives an expanded version of the TakeOrder table SQL query 9C-22. The expression in FIG. 9D is explained now to illustrate how the table SQL queries work.

9D-10 SELECT

This is the SELECT clause of the SQL expression. It signifies that the expression will return zero or more rows of data but will not modify the data.

9D-12 hKey,

The first column of the returned row is the data contained in the hKey field. This corresponds to column 9A-12 of FIG. 9A.

9D-14 hNode

The second column of the returned row is the data in the hNode field. This corresponds to column 9A-14 of FIG. 9A.

9D-16 7 as hTableID

The third column of the returned row is the number 7, the ID of the TakeOrder table. It is assigned the column name hTableID. This corresponds to column 9A-16 of FIG. 9A.

9D-18 String(3 * fLevel([hNode])"")

As explained above, this statement provides the indentation of each row of the View column. The component fLevel([hNode]) takes the value of hNode (e.g. the string 0000_0000_0000_0000_0000 in row 9A-26) and compute the level of the string (4 for the string 0000_0000_0000_0000_0000). The function string(3*4,"") then returns the string of 12 spaces. This provides the 12-space indentation of row 9A-26.

9D-20 & "Take Order" & "-" & "Date:" & [OrderDate] & "," & "Sale:" & [TotalPrice] & "," & "Buyer:" & LEFT ([Notes], 50)

This expression returns the fourth column View 9A-10, which is the actual visual display of the annotated data of the hierarchy. The expression is described as follows.

9D-26 & "Take Order" & "-" & "Date:" & [OrderDate]

The first ampersand indicates that what follows is to be concatenated to the previous component 9D-18. In this case, it is the nine spaces. The second component is the concatenation of three strings viz. "Take Order", "-" and "Date:". The component & [OrderDate] indicates that the data in the field OrderDate of the Table TakeOrder of this row is concatenated to the previous result.

The result of the SQL component 9D-26 and 9D-28 is therefor the component Take Order—Date: Apr. 5, 1995 of the row 9A-26.

Similarly 9D-30 returns the text field ", Sale:" and 9D-32 returns content of the field TotalPrice. Therefore, 9D-30 and 9D-32 displays the component Sale:335 of the row 9A-26.

Finally 9D-34 and 9D-36 returns the text field ", Buyer:" and the contents of the first 50 characters of the memo field [Notes] which is "30 day moneyback guarantee". In FIG. 9A, the last part of this string is truncated by in the figure due to space limitations.

The component 9D-22 names the fourth column of FIG. 9A as View.

Therefore, the SQL statement of FIG. 9D returns all the rows of the hierarchical view from the TakeOrder table. Similarly the remaining six SQL components 9C-10, 9C-12, 9C-14, 9C-16, 9C-18 and 9C-20 returns the appropriate rows of 9A-10 for the other six tables.

The union statements 9C-24, 9C-26, 9C-28, 9C-30, 9C-32 and 9C-34 takes the union of the rows generated by the seven table SQL queries and 9C-36 orders them according to (hKey, hNode). The result is the nine rows of four columns of FIG. 9A. The union clauses are successful because each of the seven table SQL components returns four columns, and each column has compatible data types.

In the preferred embodiment, the block 4-20 generates the SQL statement that creates one or more hierarchical views for displaying the data in a user-friendly manner. One hierarchical view is generated for each row of table hView 3A-16 for which fields in hViewDetail 3A-18 have been entered. FIG. 9C is an example of the SQL statement of such a hierarchical view created in this block and was described in detail above.

The method for generating the SQL expression in FIG. 9C from the rows entered into hView 3A-16 and hViewDetail 3A-18 is now described.

Figure 9E:
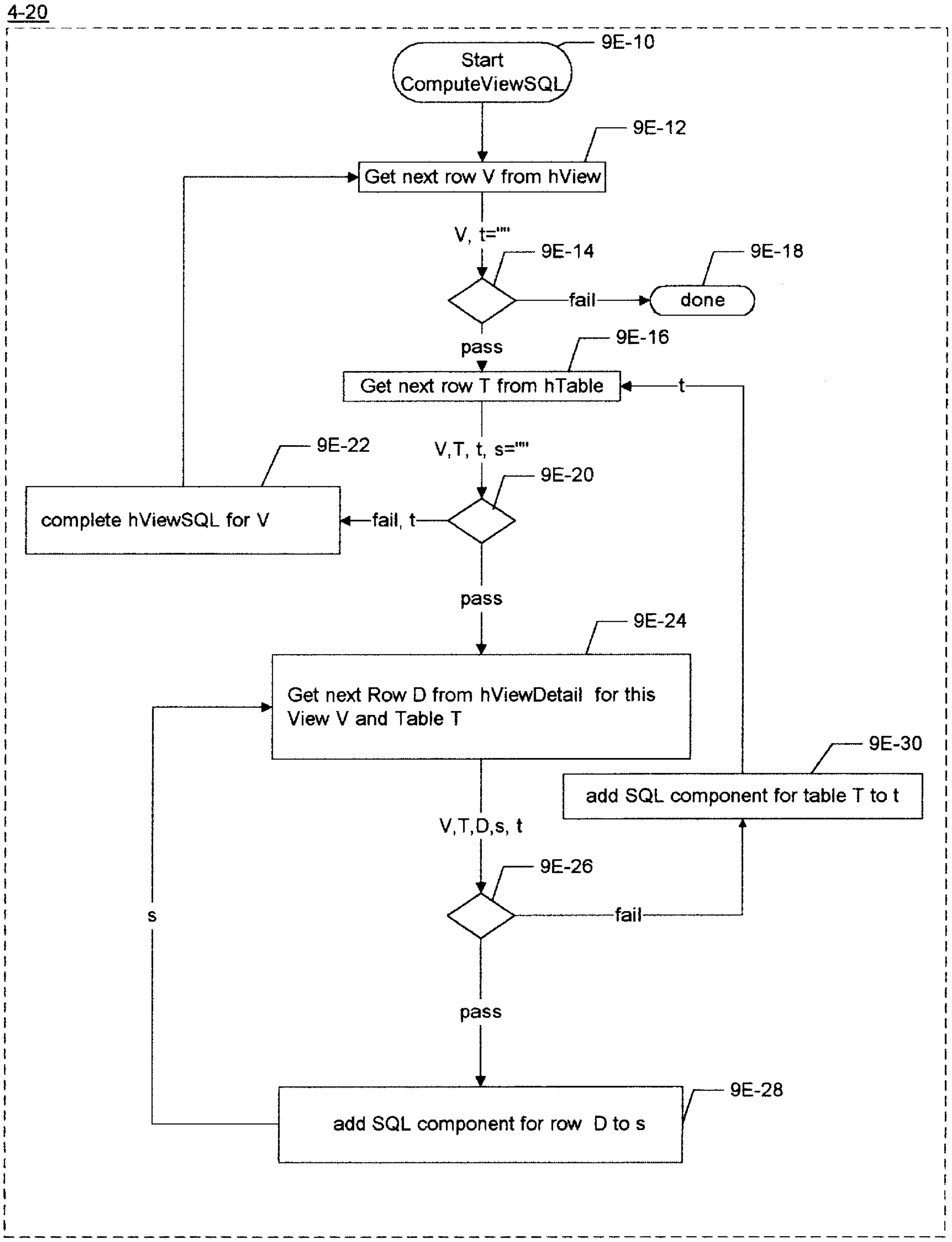
FIG. 9E shows ComputeViewSQL algorithm for constructing the hierarchical view based on the specification of the Leads Tracking Example in the preferred embodiment.
Figure 10:
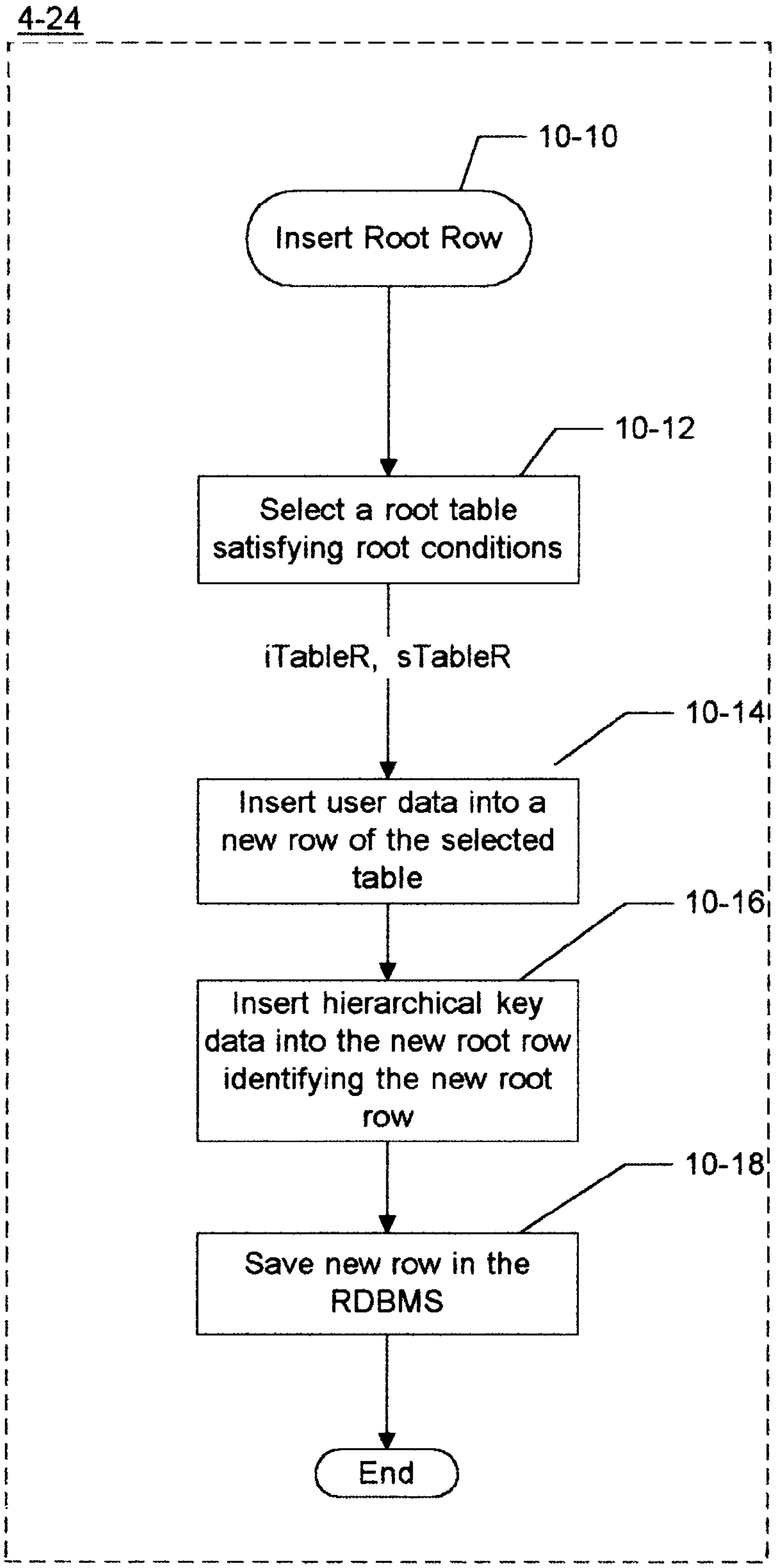
FIG. 10 shows the Insert Root Row algorithm.

FIG. 9E shows the block diagram for creating the hierarchical views using the preferred embodiment. The algorithm is now described.

9E-10 Start ComputeViewSQL

The algorithm uses the two hierarchical view tables hView 3A-16 and hViewDetail 3A-18 and the tables hTable 3A-10 and hField 3A-14.

9E-12 Get next row V from hView

The algorithm iterates through the rows of hView. The output of this block is the next row V of hView. The string variable t used for storing the view SQL string is initialized to the empty string.

9E-16 Get next row T form hTable

For each row V of hView, iterate through the rows T of hTable. The string variable s for storing the SQL string for table T is initialized here to the zero length string.

9E-24 Get next row D from hViewDetail for this View V and Table T

For each V and T iterate through the rows D of hViewDetail.

9E-28 add SQL component for row D to s

For each iteration of 9E-24 the components of the table SQL for a given row of V such as 9D-26 and 9D-28 that comprise the SQL component for rows V are added, with the appropriate additional characters such as the commas, spaces and ampersands. The result is stored in the string variable s. When the iteration 9E-24 is completed, the component such as 9D-20 for table T is stored in s.

9E-30 add SQL component for table T

When the SQL expression for all the fields of hField for the current table T are processed, the remaining portions of the SQL for the Table T are incorporated and added to the result for the previous table. This includes 9D-10, 9D-12, 9D-14, 9D-16, 9D, 18, 9D-22 and 9D-24, and if it is not the first table processed the SQL keyword UNION at the beginning of the string. The output of the algorithm at this stage is the component of FIG. 9C for the appropriate place in the iteration. For example after the third table is processed, the output of 9E-30, stored in the string variable t, is 9C-40.

9E-20 Branch

When the iteration through the tables 9E-16 is completed; the remaining SQL component 9C-22 is appended to t. The result is the SQL expression in FIG. 9C. This result is then stored in the hViewSQL field in table hView 3A-16. The processing then starts with the next row V 9E-12.

9E-14 Branch

When all the rows of hView are processed, the processing is complete and the algorithm terminates.

In a second preferred embodiment, the developer can create the hierarchical view by writing the hierarchical view SQL statement directly.

In the preferred embodiments discussed above, each component of the hierarchical keys hNode and hKey is stored in a single field of the hierarchical database data storage tables. In an alternate preferred embodiment, each of these fields may be composed of more than one field to allow better reflection of business needs of the application, and to allow the hNode key to support a greater number of levels. For example, the hNode component may consist of two fields hNode1 and hNode2. The string hNode described above would be stored in hNode1 until the 255 characters were exhausted. The remaining portion of the string starting a new level, if required, would be stored in hNode2. In this manner, twice the number of levels would be allowed. In a further alternate embodiment, the second field hNode2 is a memo field, and the sorting of hNode2 is accomplished by a sort expression of the form SORT BY hNode1, str(hNode2) where the str function converts the memo field to a string variable which is sortable. This would allow many thousands of levels, but would suffer sever performance penalties since the second field may not be indexed.

In this and the other algorithms of this brief description, a person skilled in the art will convert the algorithm description into correct code, including the adding of appropriate syntax and punctuation, to achieve the correct result.

FIG. 10

INSERT ROOT ROW (4-24)

The Insert Root Row block 7-24 allows the user to add a new root row to the hierarchical database

10-10 Insert Root Row

This starts the algorithm.

10-12 Select a root table satisfying root conditions

This block has the user select a table for the new root row. In the preferred embodiment, it must be one of the tables in the child field from the table hChild 3A-14 where the parent is a root. In the Leads Tracking Example of FIG. 1B the two tables are CorpLead (Table 1) and individLead (Table 2). The parent root corresponds to hTableIDParent=0 in FIG. 6. In the following, the table ID selected will be identified by the variable iTableR and the table name of the table selected is denoted by variable sTableR. The value of sTableR is determined from iTableR by a simple table lookup in table hTable.

10-14 Insert user data into a new row of the selected table.

The user specifies the data to be included into the new root row of selected table sTableR.

10-16 Insert hierarchical key data into the new root row identifying the new root row.

The getNextKey() function gets a new value of hKey that starts a new family, The Value of hNode is "0000" in the preferred embodiment.

10-18 Save new row in the RDBMS

The results of 10-12, 10-14 and 10-16 are combined into an SQL insert query.

The query is executed which adds the row to the table.

The insert query is illustrated by an example using the CorpLead table as the value sTableR of new root selected.

Specifically, the algorithm adds getNextKey() to field hKey and adds "0000" to hNode. The SQL expression is:

INSERT INTO CorpLead (hKey, hNode, LeadSource, LeadDate, LeadFullName, LeadMailingAddress, LeadCompany,)

VALUES(getNextKey(), "0000", 14, Mar. 15, 1995, "Paul Jones", "Box 341, Brooklyn, N.Y.,", "Acme Widgets")

This form of the insert statement adds selected fields. The fields are mentioned explicitly. Comparing this expression with 1C-12, the telephone number is missing. The values not included in the insert table takes their default values if it exists, otherwise takes a null value. The function getNextKey introduced above provides a value of hKey for the new hierarchical family. With the nine rows of the Leads Tracking Example, a new root row would have hKey="A_0003". The value of hNode is "0000" since it is a root node.

This completes the insert Root statement.

FIGS. 11A THROUGH 11C

INSERT CHILD ROW (4-26)

The Insert Child Row block 4-26 adds a child row to the hierarchical database for a selected parent row. The user selects a child table consistent with the parent table of the selected parent row and the child conditions. The steps involved for doing this are:

11A-10 Insert Child Row

This is the start of the algorithm.

11A-12 Select a row of the hierarchical database as the parent row using the child conditions.

The user selects a parent row from the hierarchical database satisfying the child conditions. The parent row selected is any row from the hierarchical database such that a child row may be created from one of the tables of the hierarchical database data storage tables. Using the preferred embodiment and the Leads Tracking Example, FIG. 6 indicates that any row from the hierarchical database may be selected as a parent row that is not a row from Table 7. Rows form Table 7 (the Take Order table) do not have children.

Selecting a parent row may be done by displaying to the user a hierarchical view as shown in FIG. 9A, and then having the user select a row of the display as the parent. (This remark applies to the update row 4-28 and delete row and its descendents blocks 4-30 also.)

The output of this step is the table number iTableP of the selected parent and the hierarchical key values, sNodeP, sKeyP of the parent.

11A-14 Select one of the allowable child tables in the hierarchical database data storage table of the selected parent row using the child conditions.

The user selects a table from the child field of table hChild 3A-16 where the parent field value is iTableP. In the Leads Tracking Example of FIG. 1B, if the parent is Table 6 (ToDo), then the child must be a new row in one of the two tables ToDo (Table 5) and Action (Table 6). The corresponding selected child table name is sTableC

11A-16 Insert user data to a new row of the selected child table.

The user provides the data to be included into the selected table new child row of selected child table sTableC.

11A-18 Insert data into the hierarchical keys to the new row that identifies the child row as a new child of the selected parent row The hKey value for the new child row is the same value as the parent row sKeyP; i.e. sKeyC=sKeyP. The value for the hNode component of the new child row, called hNodeC is determined by the function getNewChildNode described in FIG. 11B.

11A-20 Insert the new child row in RDBMS.

With the value of sNewChildNode determined from the getNewChildNode function, the results of steps 11A-12 through 11A-18 are used to insert the new row in the selected child table sTableC.

Figure 11A:
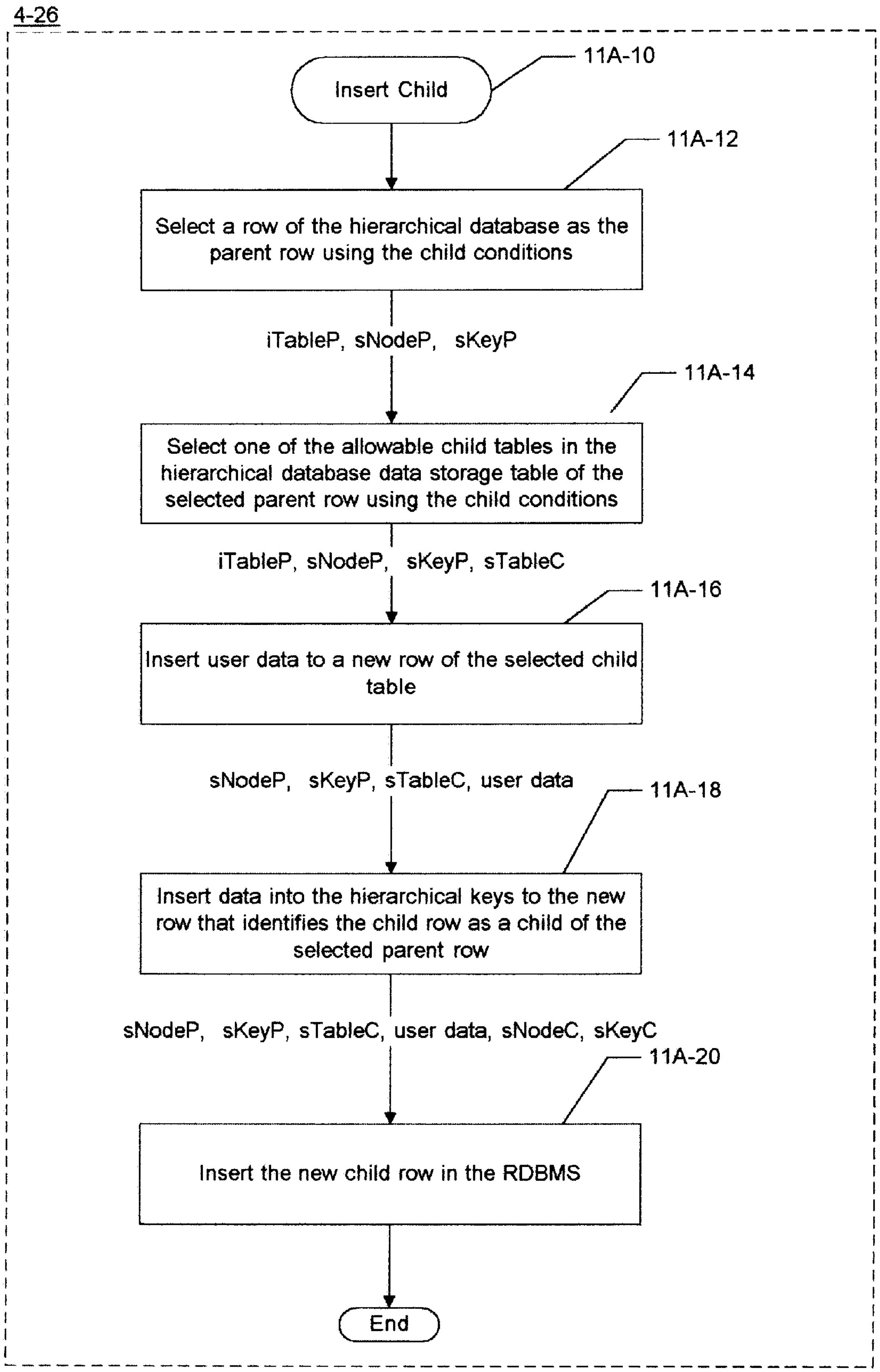
FIG. 11A shows the Insert Child Row algorithm.
Figure 11B:
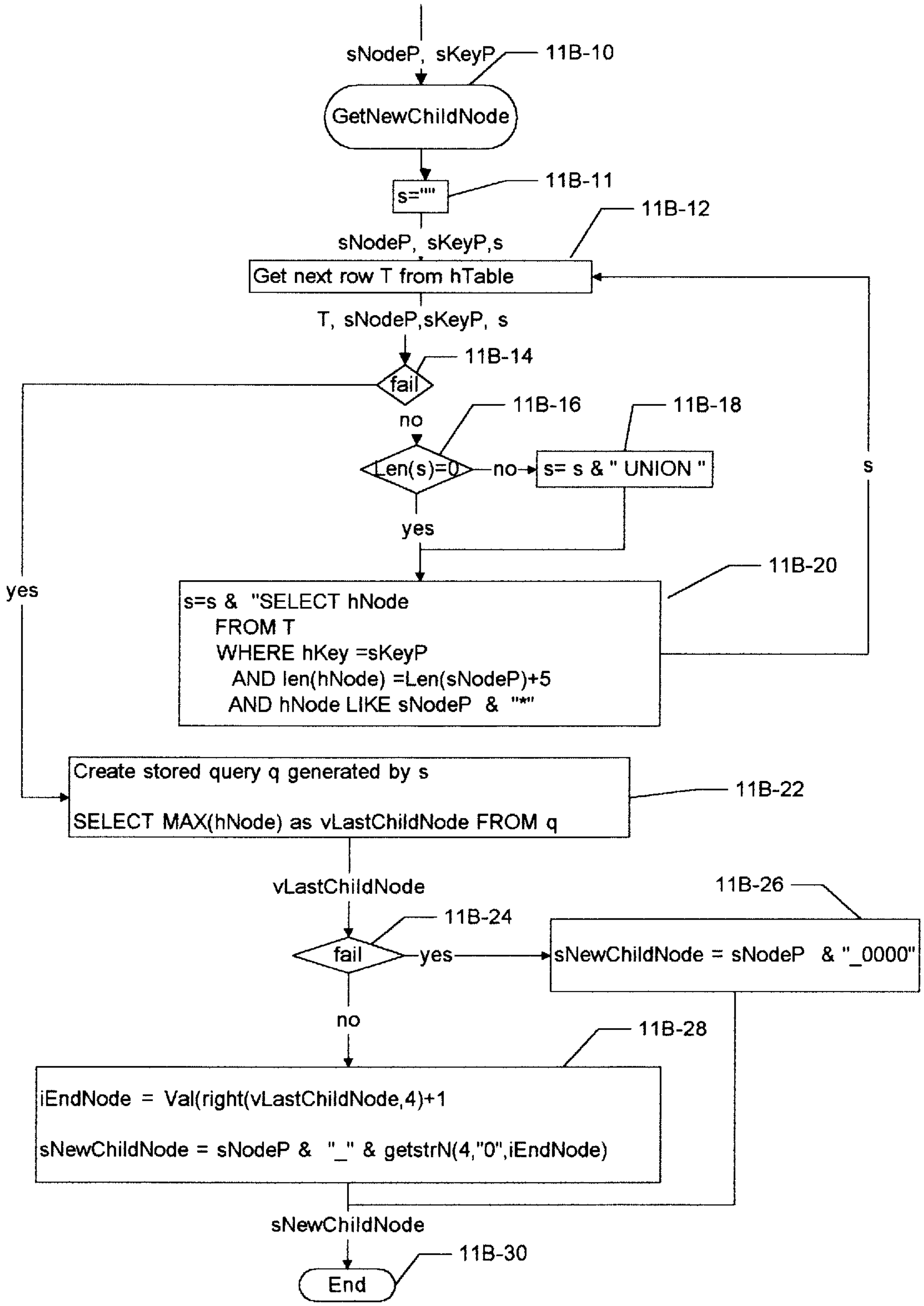
FIG. 11B shows the getNewChildNode algorithm use in FIG. 11C.
Figures 11C, 12A:
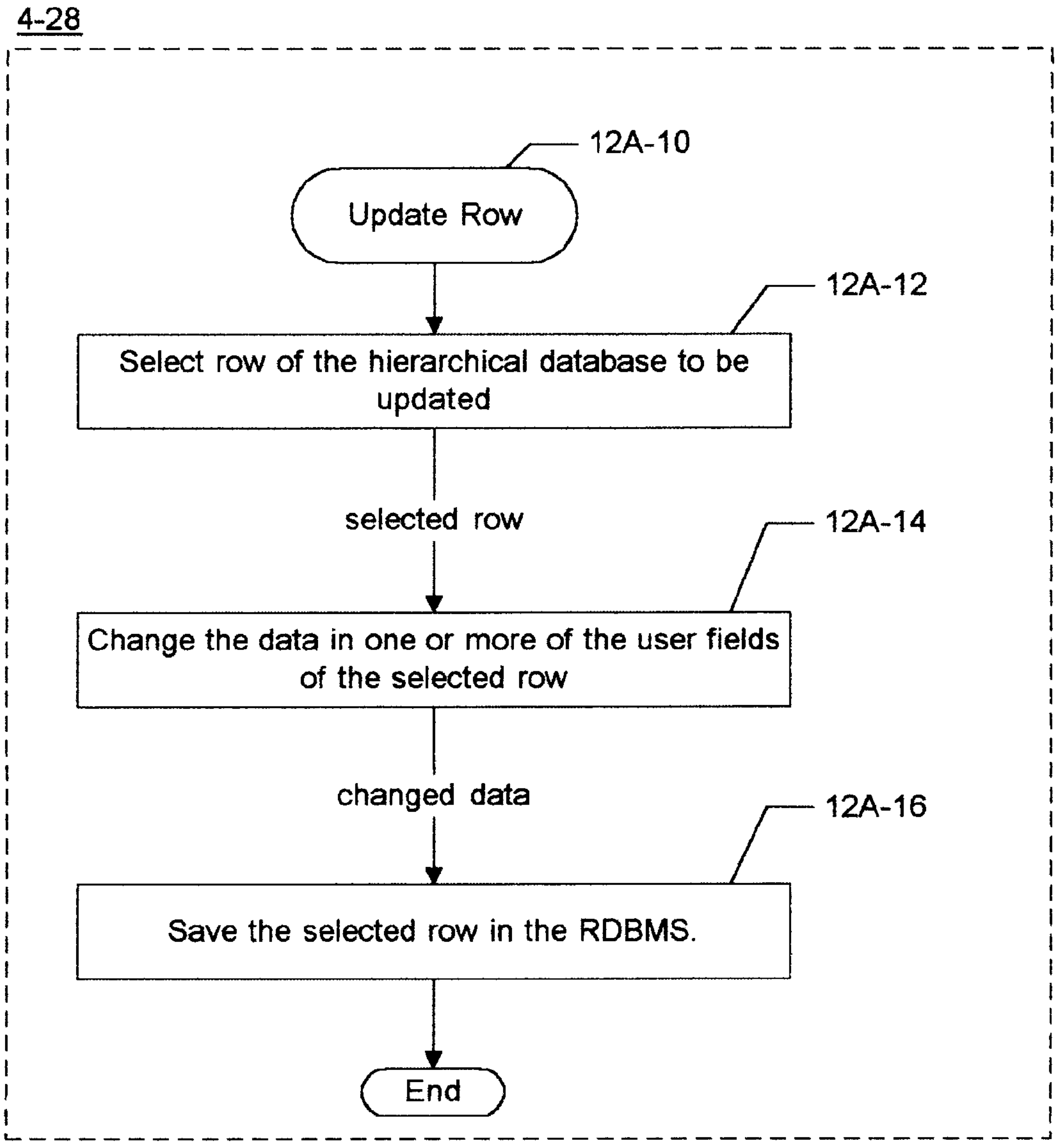
FIG. 11C shows the SQL insert query used for adding the new child row to the hierarchical database.
FIG. 12A shows Update Row algorithm.

FIG. 11C indicates the SQL insert query that accomplishes this for the Leads Tracking Example. The figure uses the Action table as the child table, and inserts the field values:

hKey=sKeyP hNode=sNewChildNode (determined from FIG. 11B) provided by the algorithm and ActionID=14

ContactFullName="Mary Doe"

Comments="This is a good lead"provided by the user. FIG. 11C uses the function getNewChildNode 11C-10 sown in FIG. 11B In an alternate embodiment, the database application software may provide the capability for displaying a new row of data for data entry from a user chosen table. In this case the developer would provide the capability to display the user data fields from the selected child table. The user would enter data into those fields and the software would automatically add the values of hKey and hNode according to the algorithms of this section. On command by the user, the new row would be saved in the RDBMS by the database application.

This completes the description of FIG. 11A.

FIG. 11B. getNewChildNode Algorithm

This is the algorithm that returns the value of hNode for the new child based on the value of hKey and hNode for the parent.

11B-10 getNewChildNode

The inputs to this algorithm are the value of hKeyP and hNodeP for the parent.

11B-11 s=""

The variable s is a string variable that is used to construct a SQL query. It is initialized as an empty string.

11B-12 Get next row T from hTable.

The table 3A-10 storing the hierarchical database data storage table identifiers are iterated through one at a time. The output of 11B-12 is the value of the string s, and T which identifies the next hierarchical database data storage table.

11B-14 Branch

If a next row is found the pass branch is taken, otherwise the fail branch is taken. For the first iteration, the pass branch is true.

11B-16 Branch

The variable s is used to construct a union query. If it is not a first pass, the word UNION is appended to the string 11B-18

11B-20 s=s &"SELECT hNode FROM T WHERE hKey=sKeyP AND len(hNode)=Len(sNodeP)+5 AND hNode LIKE sNodeP & "*"

This step adds to s a SQL string which selects all rows from the current table T with the following constraints determined by the WHERE clause:

from the same family as the parent (hKey=sKeyP);

the rows are descendents of the parent (hNode LIKE sNodeP & "*")

the rows are children of the parent (len(hNode)=Len(sNodeP)+5

The added SQL string selects the children of the parent since in this preferred embodiment, the hNode value of the children have length 5 greater than the string of the parents and start with the parent's hNode value.

The returned rows of the query stored in s when all the tables are processed (the fail branch of 11B-14 is true) are the values of hNode for all children of the selected parent row.

11B-22 Create stored query q generated by s; SELECT MAX(hNode) as vLastChildNode FROM q.

The stored query q returns all child hNode values based on the parent node value sNodeP. The second query returns the maximum value of the child nodes returned by q. The output of 11B-22 is the variable vLastChildNode. If at least one row is returned from q, then vLastChildNode will contain the value of hNode for the last child node ordered by string sort order. If q returns no rows then the selected parent has no children and vLastChildNode is null.

11B-24 branch.

If vLastChildNode is null, the branch goes to 11B-26 otherwise it branches to 11B-28

11B-26 sNewChildNode=sNodeP & "_0000"

If the fail branch is taken 11B-24, the parent row has no children. Therefore, a first child is created with hNode value composed of the parent's hNode value sNodeP and the string "_0000" concatenated on the right.

11B-28 iEndNode=Val(right(vLastChildNode, 4)+1;

sNewChildNode=sNodeP & "_" & getstrN(4, "0", iEndNode)

If the pass branch in 11B-24 is taken, the value of the last child node vLastChildNode is output in 11B-22. The function Val(right(vLastChildNode, 4)+1 takes the last four characters of vLastChildNode, evaluates it as a number, and adds 1 to it. Hence if vLastChildNode is "0000_0213_0023, iEndNode returns the number 24.

The function getstrN(4, "0", iEndNode) evaluates as follow. It takes the number iEndNode, converts it to a character representation and left zero-fills the result with "0" so that the string has length 4. Therefore if vLastChildNode is 25, the function getstrN(4,"0", 25) returns the string "0025".

For an example, if the value of sNodeP is "0000_0213" and vLastChildNode is "0000_0213_0023", then the value of sNewChildNode is sNodeP & "_" & "0024"="0000_0213_0024".

This completes the description of FIG. 11B and the block Insert Child Row 4-26.

FIGS. 12A AND 12B

UPDATE ROW (4-28)

The Update Child Row block 4-28 block updates a row from the hierarchical database. The row is identified by its hierarchical key values for hkey and hNode, called here sKeyU and sNodeU. The table name the row is based on, sTableU, is also available.

12A-10 Update Row

This is the start of the algorithm

12A-12 Select row of the hierarchical database to be updated

The user selects row in the hierarchical database to be updated. The output of this step is the selected row which includes the hierarchical key field values sKeyU and sNodeU, and the table name of the row, sTableU.

12A-14 Change the data in one or more of the user fields of the selected row.

The user changes the user data field data as appropriate. The output of this step is the field names of the fields which have been changed and the new data values for these fields.

12A-16 Save the selected row in the RDBMS.

This is done in the preferred embodiment using an update query. The SQL update query for doing this is the illustrated for the Leads Tracking Example for row 9A-18 of FIG. 9A. In the following sTableU="CorpLead", sKeyU="A_0001" and sNodeU="0000"

The actual query is shown in FIG. 12B.

12-10 UPDATE CorpLead

This identifies table to be updated.

12B-12 SET LeadFullName="Jim Doe"

This gives the single field to be updated and gives the new field value

12B-14 WHERE hKey="A_0001" AND hNode="0000"

This identifies the row to be updated in table CorpLead.

Executing the query updates the row.

FIG. 13

DELETE ROW AND ITS DESCENDENTS (4-30)

Figure 13:
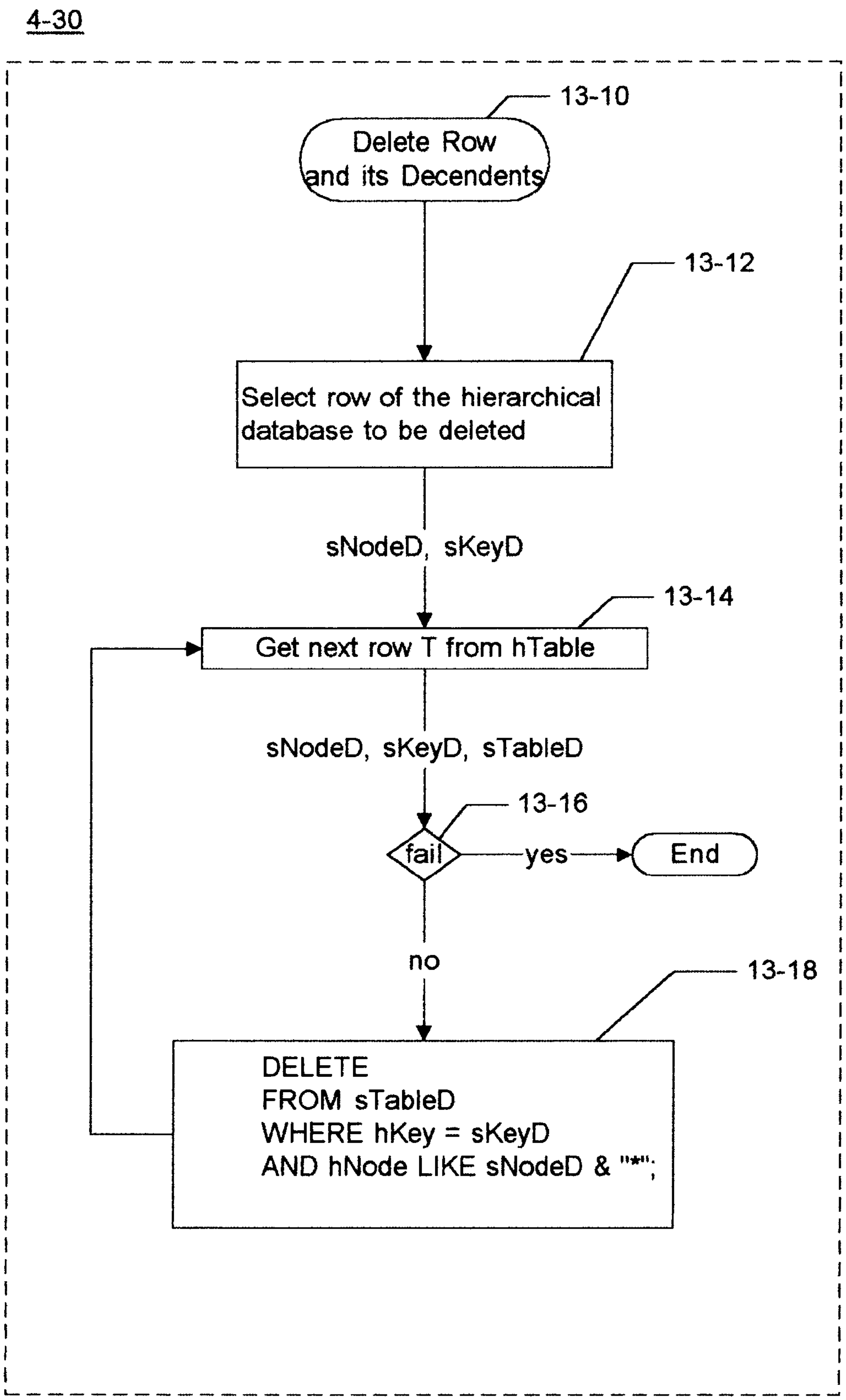
FIG. 13 shows the Delete Row and its Descendents algorithm.

The Delete Row and its Descendents block 4-30 deletes a row and its descendents from the hierarchical database. FIG. 13 illustrate the delete function implementing 4-30

13-12 Select row of the hierarchical database to be deleted.

The row of the database to be deleted is selected. The output of this step is the hierarchical key values of the selected row: hNode=sNodeD and hKey=sKeyD.

13-14 Get next row T from hTable.

The algorithm iterates through the tables T of the hierarchical database storage tables. In the preferred embodiment; the rows of hTable 3-10 are iterated through.

3-16 Branch.

If the fail path is taken, no more tables exist and the algorithm terminates successfully. If it passes, then the table name sTableD of the table T is outputted, together with the values of sNodeD and sKeyD.

3-18 DELETE * FROM sTableD

WHERE hKey=sKeyD AND hNode LIKE sNodeD & "*"

This step executes a delete query for the current table sTableD. It deletes all the rows in table sTableD that have hKey value=sKeyD (i.e. from the same family as the selected row) and have values for hNode starting with the sNodeD. This is precisely the selected row and all its descendents.

FIGS. 14A THROUGH 14D

RETRIEVE REQUESTED DATA (4-32)

The Retrieve Requested Data block 4-23 refers to the process of returning displays of the hierarchical database data that satisfies some user requested selection and display criteria. The hierarchical view presented in 9A-10 of FIG. 9A IS an example of this. Selected fields from each row of the hierarchical data are presented with the data is ordered by the hierarchical keys hKey and hNode.

In general, displaying data with arbitrary selection critical requires that a developer write an appropriate SQL select query. This invention facilitates this process since the hierarchical database is stored in relational tables and the database application has the full facilities of the RDBMS to create SQL statements; including joins, aggregate functions and the rich range of SQL capabilities.

FIGS. 14A through 14*e* give an example of this capability. The hierarchical views are displayed; however they are ordered by first and last name, then hKey and hNode instead of the usual hKey and hNode.

FIG. 14A gives a stored union query called qryRoot written in Microsoft Access SQL which selects the fields hKey and the computed field SORT1 from the root tables of the Leads Tracking Example. SORT1 14A-10 is the field leadFullName from the Corp leads table and the fields firstName and LastName separated by a space from the lndivLead table.

FIG. 14B gives a stored union query written in Microsoft Access called qryview which is the same hierarchical view SQL select query as given in FIG. 9C, except that the ORDER BY clause in the last line of FIG. 9C is missing. This query therefore generates the same rows of data as generated by the SQL query in FIG. 9C, but does not specify the order of the rows.

FIG. 14C gives a query called qryViewSortedByName, which contains a join of the queries qryRoot and qryView where the queries are joined by the field hKey. This query displays the two fields SORT1 and the field ViewSQL. The ORDER BY clause in this query 14C-10 orders by the fields by SORT1, hkey and hNode. This has the result of reordering the view given by FIG. 9C using the SORT1 computed field to sort the families by first and last name, and then sorts by the hKey and hNode fields to order rows within a hierarchical family in the proper order.

FIG. 14D displays the output of this query. The first column 14D-10 displays the root table first and last name field associated with each hierarchical family and column 14D-12 displays the hierarchical view data for each row. It should be noted that for this simple example with two families, the actual row order is coincidentally the same as in FIG. 9A. This will not generally be the case.

FIG. 15

IMPLEMENTING MULTIPLE HIERARCHICAL DATABASES IN THE SAME APPLICATION

The methods of the previous sections presents methods for implementing a hierarchical database in an RDBMS. The methods are easily extended to include multiple hierarchical databases in the same application. This extension requires three modifications to the existing methods; easily implemented by someone skilled in the art. The first is to identify which hierarchical database is being used. The second is to identify the hierarchical database data storage tables and hierarchical views belong to the hierarchical database in use. Finally, the algorithms need to be modified to use only tables and views belonging to the hierarchical database in use.

Figure 15:
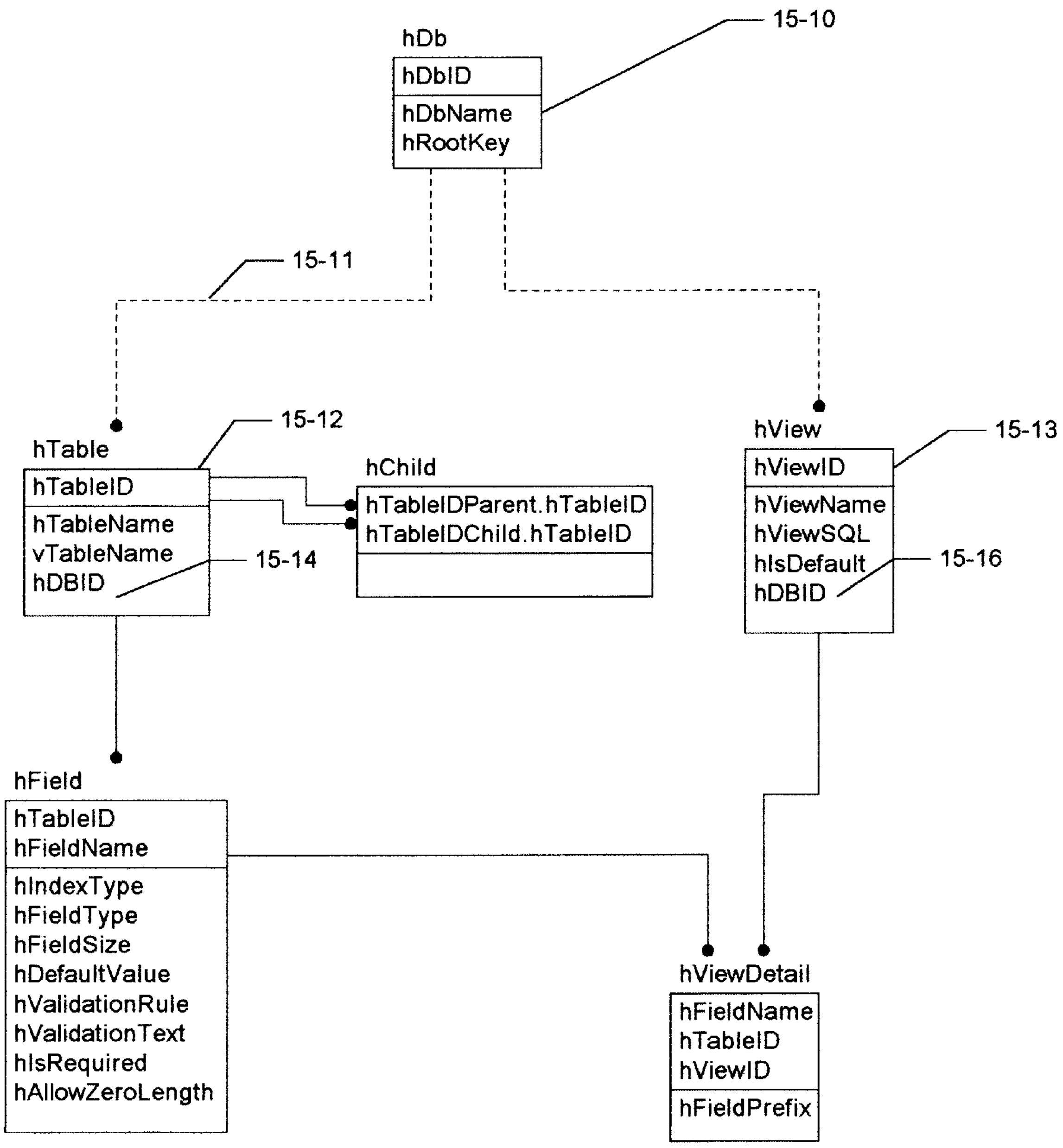
FIG. 15 shows the entity-relation attribute specification tables for creating multiple hierarchical databases

FIG. 15 shows a modification of FIG. 3A that extends the FIG. 3A to work with multiple hierarchical databases in the same application. The table hDb is added which indexes the hierarchical databases by the primary key hDbID. The remaining fields in the table are as follows. hDbName names the hierarchical database (for the Leads Tracking Example, hDbName could be "Leads Tracking Database"). The field hRootKey identifies the database. In the Leads tracking example, the value of hKey="0000" was used to identify a root row. This is the value of hRootKey. For a second hierarchical database in the same application, a value of "0001" could be used.

The connector 15-11 indicates a non-identifying relationship of table hDb and hTable. The table hTable has its own primary key not related to that of hDb. However, each table in hTable is identified with only one hierarchical database; this is determined by the non-primary key hDbID 15-14 in hTable, which must match a value of hDbID in hDB. Similar discussion applies to the connector between hDbID and hView and the field hDbID 15-16 in table hView 15-13.

Table hTable 15-12 gives the table names of all the hierarchical database data storage tables for all hierarchical databases in the application. The non-primary key field hDbID in hTable identifies which hierarchical database of hDb the table belongs to. Similarly, the table hView 15-13 gives all the hierarchical views for all the hierarchical databases and the non-primary key field hDbID in hView identifies which database from hDb the hierarchical view belongs to. With these preliminaries, the algorithm in the preceding sections are modified as follows.

Once a hierarchical database is selected by selecting a value of hDbID, then in the algorithms:

a. The root value "0000" is replaced by hRootKey;

b. Iteration over data storage tables (table hTable in the preferred embodiment) is restricted to tables with hDbID value corresponding to the selected hDbID;

c. Iteration over views (table hView in the preferred embodiment) is restricted to tables with hDbID value corresponding to the selected hDbID With these modifications, the previous results apply.

While the invention has been shown and described with reference to the preferred embodiment thereof, it will be understood by those skilled in the art that the above and other changes in form or detail may be made therein without departing from the spirit and scope of the invention.

I claim:

1. A method of using a relational database management system (RDBMS) for managing rows of data in a hierarchical database, including the steps of:

A. creating a set of one or more hierarchical database data storage tables in the RDBMS, consisting of hierarchical key fields and user data fields for storing rows of data of the hierarchical database wherein each row of the hierarchical database is a row in one of the hierarchical database data storage tables;

B. specifying root conditions determining which of said hierarchical database data storage tables may be used to create a new row in said hierarchical database called a root row;

C. specifying child conditions, wherein for each row of the hierarchical database, called a parent row, the child conditions determine which of the hierarchical database data storage tables may be used to create a new child row of the parent row;

D. defining descendents of the root row and hierarchical families of the hierarchical database wherein: the descendents of the root row consists of all children of the root row and all children of a previous descendent of the root row, and each hierarchical family consists of the root row and its descendents;

E. specifying data to be inserted in the hierarchical keys of the new root row, and the new child row of a selected parent row, that:
distinguishes each of the hierarchical families,
distinguishes each of the root rows, and
identifies the parent row of each child row;

F. creating a new hierarchical family in the hierarchical database by inserting the new root row into the hierarchical database;

G. creating the new child row into the hierarchical database of the selected parent row by inserting the new child row into the hierarchical database;

H. updating a selected hierarchical database row;

I. deleting the selected or a subsequent selected hierarchical database row and its descendants;

J. creating one or more SQL select queries, hereafter called hierarchical views, wherein:

applying each hierarchical view to the hierarchical database creates hierarchical view rows, each of the hierarchical view rows contains information from a row of the hierarchical database, each row in the hierarchical database has a corresponding row in the hierarchical view rows, the hierarchical view rows of each hierarchical family are displayed contiguously, each child row of the hierarchical view rows follows its parent row, and each child row is visually identified with its parent.

K. retrieving requested hierarchical data.

2. The method of claim 1 wherein the creating of the hierarchical database data storage tables include the steps of:

A. specifying one or more of the hierarchical database data storage tables;

B. specifying one or more user fields and user fields properties for each hierarchical database data storage table for storing user entered data;

C. specifying fields for storing hierarchical keys in each hierarchical database data storage table that uniquely identify each row in the hierarchical database;

D. creating the hierarchical database data storage tables as tables in the RDBMS.

3. The method of claim 2 of specifying the root conditions, including the steps of:

A. specifying the root conditions that a table in the hierarchical database data storage tables may be used to create the root row of the hierarchical database;

B. storing the root conditions.

4. The method of claim 2 of specifying the child conditions, including the steps of:

A. specifying conditions such that the table in the hierarchical database data storage table may be used to create the child row of the selected parent row in the hierarchical database;

B. storing the child conditions.

5. The method of claim 4 of specifying data to be inserted in the hierarchical keys of the new root row, and the new child row of the selected parent row, that distinguishes each of the hierarchical families, distinguishes each of the root rows, and identifies the parent row of each child row includes the steps of:

A. creating data in one or more fields of the hierarchical keys that distinguishes each family;

B. creating data in a subsequent one or more fields of the hierarchical keys for identifying children of a given parent in a family composed of a strings satisfying the conditions that:

the strings for a row for the subsequent fields is the same for all root rows in the hierarchical database, the strings of the parent row for the subsequent fields is contained in the strings of the corresponding child's strings with an additional string component appended to one of the child row's strings such that the hierarchical keys are unique within a hierarchical family and the parent row occurs before the child row when sorted by the hierarchical keys.

6. The method of claim 5 of creating the new hierarchical family in the hierarchical database by inserting the new root row into the hierarchical database including the steps of:

A. selecting one of the tables of the hierarchical database data storage tables satisfying the root conditions;

B. inserting user data into a new row of the selected table;

C. inserting data into the hierarchical keys for identifying the new root row as the root row of the new family;

D. saving the new root row in the RDBMS.

7. The method of claim 6 of creating the new child row in the hierarchical database of the selected parent row including the steps of:

A. identifying the row of the hierarchical database as the parent row using the child conditions;

B. selecting one of the allowable child tables in the hierarchical database data storage table of the selected parent row using the child conditions;

C. inserting user data to the new row of the selected child table;

D. inserting data into the hierarchical keys to the new row that identifies the child row as a child of the selected parent row;

E. saving the new child row in RDBMS.

8. The method of claim 2 of updating the selected hierarchical database row includes the steps of:

A. selecting the row of the hierarchical database to be updated;

B. changing the data in one or more of the user fields of the selected row;

C. saving the selected row in the RDBMS.

9. The method of claim 6 of deleting the selected hierarchical database row and its descendants includes the steps of:

A. selecting the row of the hierarchical database to be deleted;

B. deleting the selected row in deleting and all its descendent rows in the RDBMS.

10. The method of claim 7 of creating the hierarchical views includes the steps of:

A. specifying a number of hierarchical views;

B. creating for each hierarchical view a SQL select query for each table in the hierarchical database data storage tables that:

includes the hierarchical key fields, may include information from a number of fields in the table, and may include descriptive text concerning the number of the fields in the table;

C. creating the hierarchical view as a union query composed of the SQL select query for each table in the hierarchical database data storage tables;

D. ordering the union query so rows from the same family are contiguous and each child in a family follows its parent;

E. storing the hierarchical views.

11. The method of claim 10 of retrieving requested hierarchical data includes the steps of:

A. creating a SQL select query applied to hierarchical database data storage tables that returns zero or more rows containing user requested information;

B. executing the query.

12. An apparatus for implementing a hierarchical database management system (HDBMS) used for creating and maintaining hierarchical databases using a relational database management system (RDBMS) as an implementing apparatus comprising;

a computer system for receiving hierarchical database information provided by a user, said computer system including, a database application for converting said hierarchical database information to a database consistent format;

HDBMS software including SQL statements with interface to said RDBMS;

said HDBMS software being responsive to said database application for issuing commands for the creating and managing of said hierarchical database using said hierarchical database information in said database consistent format;

said RDBMS for executing said commands issued by said HDBMS software;

said HDBMS software being further responsive to said RDBMS for receiving and processing results of said executed commands;

said database application for receiving and converting said HDBMS software results to computer format;

said computer system displaying said computer format.

13. The apparatus of claim 12 wherein said RDBMS comprises:

a commercially available RDBMS.

14. The apparatus of claim 13 wherein said HDBMS software comprises:

a means of creating a set of one or more hierarchical database data storage tables in said RDBMS, consisting of hierarchical key fields and user data fields for storing rows of data of said hierarchical database wherein each row of said hierarchical database is a row in one of said hierarchical database data storage tables.

15. The apparatus of claim 14 wherein said HDBMS software further comprises:

a means of specifying root conditions determining which of said hierarchical database data storage tables may be used to create a new row in said hierarchical database called a root row.

16. The apparatus of claim 15 wherein said HDBMS software further comprises:

a means of specifying child conditions, wherein for said each row of said hierarchical database, called a parent row, said child conditions determine which of said hierarchical database data storage tables may be used to create a new child row.

17. The apparatus of claim 16 wherein said HDBMS software further comprises:

a means of defining descendents of said root row and hierarchical families of said hierarchical database wherein said descendents of said root row consists of all children of said root row and all children of a previous descendent of said root row, each hierarchical family consisting of said root row and its descendents.

18. The apparatus of claim 17 wherein said HDBMS software further comprises:

a means of specifying data to be inserted in said hierarchical keys of said new root row, and said new child row of a selected parent row, that distinguishes each of said hierarchical families, distinguishes each of said root rows, and identifies said parent row of each child row.

19. The apparatus of claim 18 wherein said HDBMS software further comprises:

a means of creating a new hierarchical family in said hierarchical database by inserting said new root row into said hierarchical database.

20. The apparatus of claim 19 wherein said HDBMS software further comprises:

a means of creating said new child row into said hierarchical database of said selected parent row by inserting said new child row into said hierarchical database.

21. The apparatus of claim 19 wherein said HDBMS software further comprises:

a means of updating a selected hierarchical database row.

22. The apparatus of claim 19 wherein said HDBMS software further comprises:

a means of deleting said selected or a subsequent selected hierarchical database row and its descendants.

23. The apparatus of claim 20 wherein said HDBMS software further comprises:

a means of creating one or more SQL select queries, hereafter called hierarchical views, wherein:

applying each hierarchical view to said hierarchical database creates hierarchical view rows, each of said hierarchical view rows contains information from a row of said hierarchical database, each row in said hierarchical database has a corresponding row in said hierarchical view rows, said hierarchical view rows of each hierarchical family are displayed contiguously, each child row of said hierarchical view rows follows its parent row, and each child row is visually identified with its parent.

24. The apparatus of claim 23 wherein said HDBMS software further comprises:

a means of retrieving requested hierarchical data.

25. The apparatus of claim 23 wherein said database application comprises:

a database application with developer added functionality for receiving user information specifying and managing information about and in said hierarchical database, and for outputting information from said hierarchical database.

26. The apparatus of claim 25 wherein said computer system comprises:

one or more client computers used by users of the system for entering said hierarchical database data, receiving said hierarchical database information and storing data and software of said HDBMS software;

a server computer for storing said RDBMS software and some elements of said HDBMS, which may be a same computer as said client computers;

a communication means for exchanging information among said computers if said server is not said client computer;

devices for displaying hierarchical and relational database output.

27. A method for implementing a hierarchical database management system (HDBMS) used for creating and maintaining hierarchical databases using a relational database management system (RDBMS) and HDBMS software including SQL statements with interface to said RDBMS, including the steps of:

A. inputting user provided hierarchical database information into a computer system;

B. applying the hierarchical database information to a database application for use by the HDBMS software;

C. using the HDBMS software for issuing commands for creating and maintaining the hierarchical database provided by the hierarchical database information;

D. using an RDBMS for executing the commands of the HDBMS software for creating and maintaining the hierarchical database;

E. outputting requested elements of the data to the database application from the RDBMS;

F. displaying the requested elements of the data on the computer system.

28. The method of claim 27 wherein implementing the computer system includes the steps of:

A. implementing one or more client computers used by users of the system for entering hierarchical database data, receiving hierarchical database information and storing data and software of the HDBMS;

B. implementing a server computer for storing the RDBMS and some elements of the HDBMS, which may be a same computer as the client computers;

C. implementing a communication means for exchanging information among the computers if the server is not the client computer;

D. implementing devices for displaying hierarchical and relational database output.

29. The method of claim 28 wherein implementing the database application includes the steps of:

A. implementing a database application with developer added functionality for receiving user information;

B. specifying and managing information about and in said hierarchical database; and for C. outputting information from said hierarchical database.

30. The method of claim 29 wherein implementing the HDBMS software includes:

A. creating a set of one or more hierarchical database data storage tables in the RDBMS, consisting of hierarchical key fields and the user data fields for storing rows of data of the hierarchical database wherein each row of the hierarchical database is a row in one of the hierarchical database data storage tables.

31. The method of claim 30 wherein the HDBMS software further includes:

A. specifying root conditions determining which of said hierarchical database data storage tables may be used to create a new row in said hierarchical database called a root row.

32. The method of claim 31 wherein the HDBMS software further includes:

A. specifying child conditions, wherein for each row of the hierarchical database, called a parent row, the child conditions determine which of the hierarchical database data storage tables may be used to create a new child row.

33. The method of claim 32 wherein the HDBMS software further includes the steps of:

A. defining descendents of a root row and hierarchical families of the hierarchical database wherein the descendents of the root row consists of all children of the root row and all children of a previous descendent of the root row, B. defining each hierarchical family consisting of a root row and its descendents.

34. The method of claim 33 wherein the HDBMS software further includes the steps of:

A. specifying data to be inserted in the hierarchical keys of the new root row, and the new child row of a selected parent row, that B. distinguishes each of the hierarchical families, distinguishes each of the root rows, and identifies the parent row of each child row.

35. The method of claim 34 wherein the HDBMS application further includes:

A. creating a new hierarchical family in the hierarchical database by inserting the new root row into the hierarchical database.

36. The method of claim 35 wherein the HDBMS software further includes:

A. creating the new child row into the hierarchical database of a selected parent row by inserting the new child row into the hierarchical database.

37. The method of claim 35 wherein the HDBMS software further includes:

A. updating a selected hierarchical database row.

38. The method of claim 36 wherein the HDBMS software further includes:

A. deleting the selected or a subsequent selected hierarchical database row and its descendants.

39. The method of claim 36 wherein the HDBMS software further includes the steps of:

A. creating one or more SQL select queries, hereafter called hierarchical views, wherein:

B. applying each hierarchical view to the hierarchical database creates hierarchical view rows such that:

each of the hierarchical view rows contains information from a row of the hierarchical database, each row in the hierarchical database has a corresponding row in the hierarchical view rows, the hierarchical view rows of each hierarchical family are displayed contiguously, each child row of the hierarchical view rows follows its parent row, and each child row is visually identified with its parent.

40. The method of claim 39 wherein the HDBMS software further includes:

A. retrieving requested hierarchical data.

41. The method of claim 40 wherein implementing the RDBMS includes the steps of:

A. implementing on the server a commercially available RDBMS.

* * * * *